United States Patent [19]
Lysle

[11] 3,781,106
[45] Dec. 25, 1973

[54] OPTICAL APPARATUS FOR PRODUCING AND/OR USING PHOTOCONDUCTIVE FILM HAVING A SPECULAR SURFACE SELECTIVELY DEFORMED IN IMAGE AREAS THEREOF

[75] Inventor: Gordon Lysle, Greenlawn, N.Y.

[73] Assignee: Gordon Lysle Incorporated, East Northport, N.Y.

[22] Filed: Apr. 17, 1972

[21] Appl. No.: 244,737

[52] U.S. Cl. .................................................. 355/9
[51] Int. Cl. ............................................ G03g 15/00
[58] Field of Search ............................. 355/9; 346/74

[56] References Cited
UNITED STATES PATENTS

| | | | |
|---|---|---|---|
| 3,318,698 | 5/1967 | Schwertz | 355/9 X |
| 3,615,387 | 10/1971 | Corrsin | 355/9 X |
| 3,263,557 | 8/1966 | Cunningham | 355/9 |
| 3,547,628 | 12/1970 | Wolff | 355/9 |
| 3,535,031 | 10/1970 | Spreitzer | 353/79 |

*Primary Examiner*—John M. Horan
*Attorney*—Elmer R. Helferich et al.

[57] ABSTRACT

Optical apparatus to produce and/or use photoconductive and thermoplastic film having a specular surface selectively deformed in image areas thereof. A preferred form of this film is opaque. In one recording form of this apparatus an objective lens unit in an optical path defined by optical elements thereof receives a recording beam of light consisting of a bundle of light rays reflected from an image of a field of view, e.g., a flood lighted record sheet, and transmits this beam as an essentially collimated bundle of the rays bearing an image of the field of view to means holding such a film with its specular surface exposed in an optical aperture to this image-bearing beam. Electrostatic charge and heat applying means are located closely adjacent to, but spaced from the optical aperture to impose upon the film specular surface the electrostatic charge in a latent pattern corresponding to the darker areas of the image borne by the beam and to heat soften and deform by depression the electrostatically charged film surface areas which, upon cessation of radiation of the heat to this film surface, causes by cooling the temporary fixing or freezing of the deformed image darker portions to produce a rippled specular surface film. In another, projection form of the apparatus a projecting light source is associated with a beam splitter optically beyond such optical aperture and such an objective lens unit to project the bundle of light rays of an initial portion of a projection light beam from the beam splitter through the lens unit to such a rippled specular surface film exposed in the optical aperture. A secondary portion of this projection beam is then reflected back from the rippled specular surface of the film at the optical aperture along a common path through the lens unit to the beam splitter, where it is separated by the latter from the initial projection beam portion to be projected in focus to a display or read-out plane, such as a viewing screen. In still another form of the apparatus these recording and projection equipments or systems are combined to employ alternatively in the recording and projecting modes the same objective lens unit, the same film exposing optical aperture and the viewing screen which, in the recording mode, provides a support for any properly sized record sheet. A common light beam path is provided between the film exposing optical aperture and the viewing screen which has mounted therein between the beam splitter and the viewing screen a movable prism mount which selectively inserts into this path a common reflective prism in the recording mode and an amici prism in the projecting mode.

12 Claims, 17 Drawing Figures

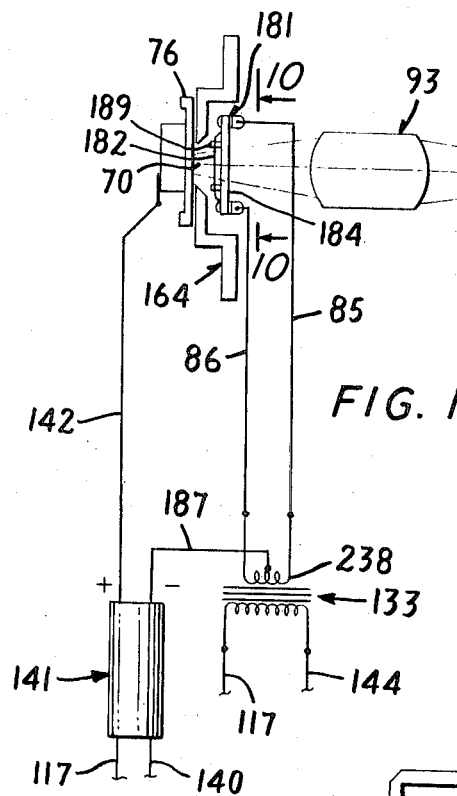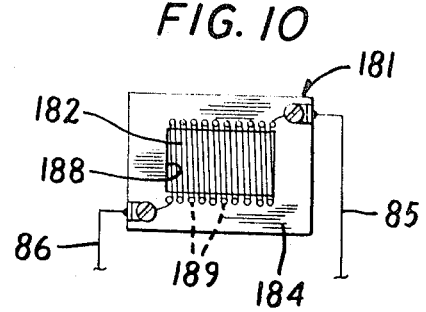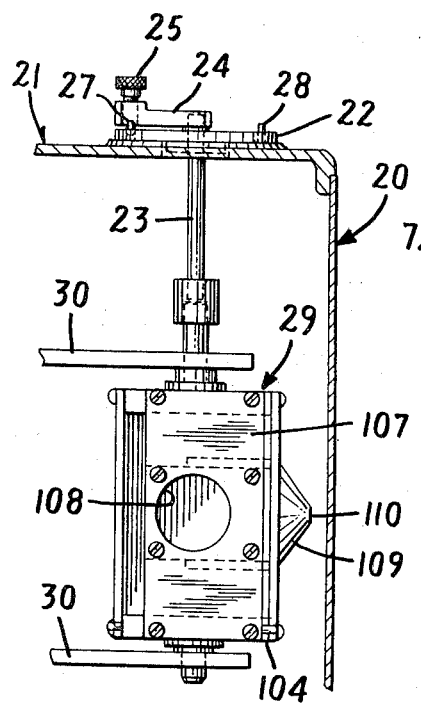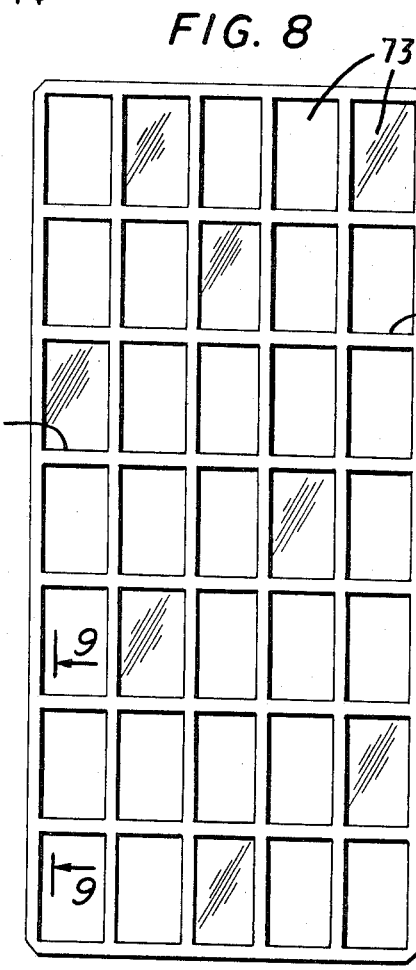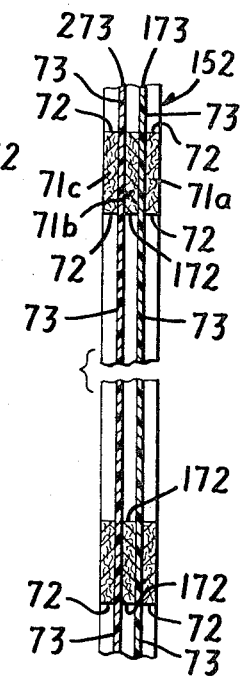

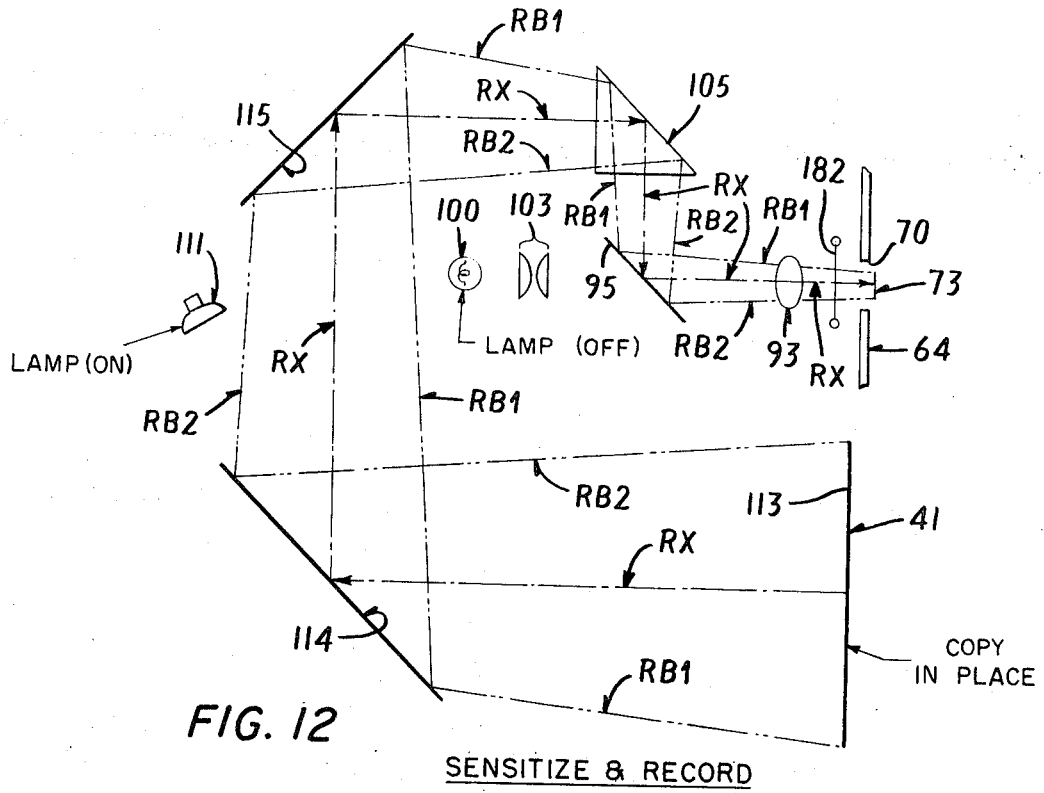
FIG. 12 — SENSITIZE & RECORD
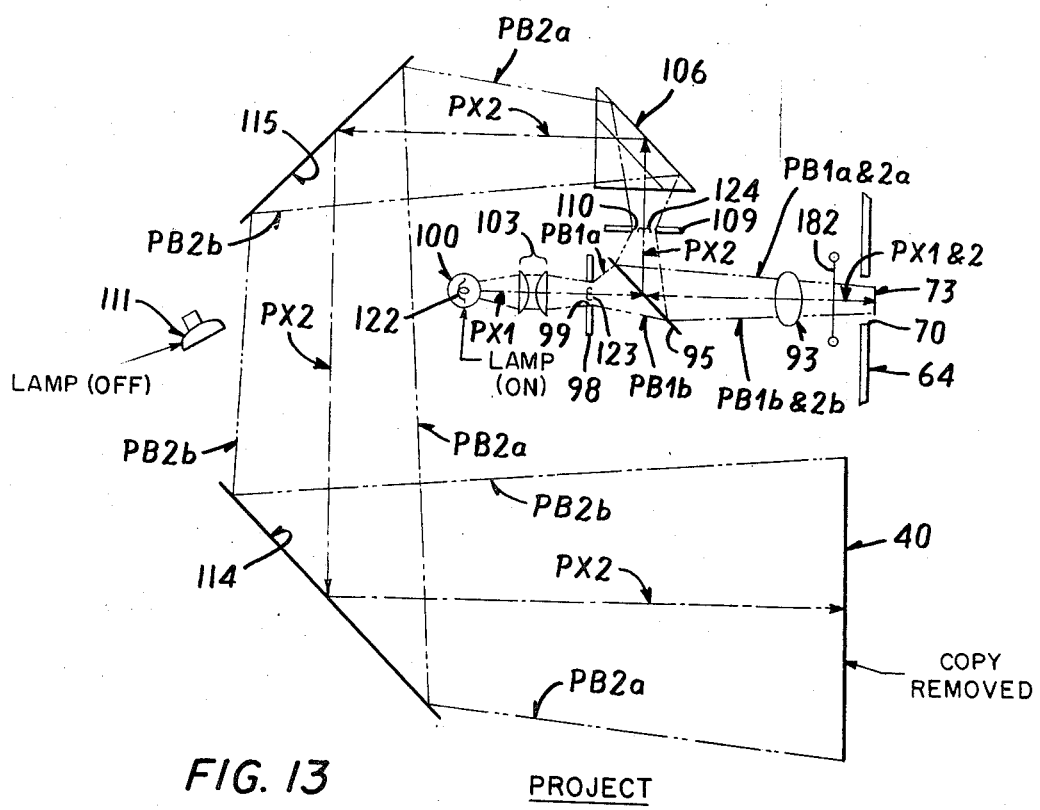
FIG. 13 — PROJECT

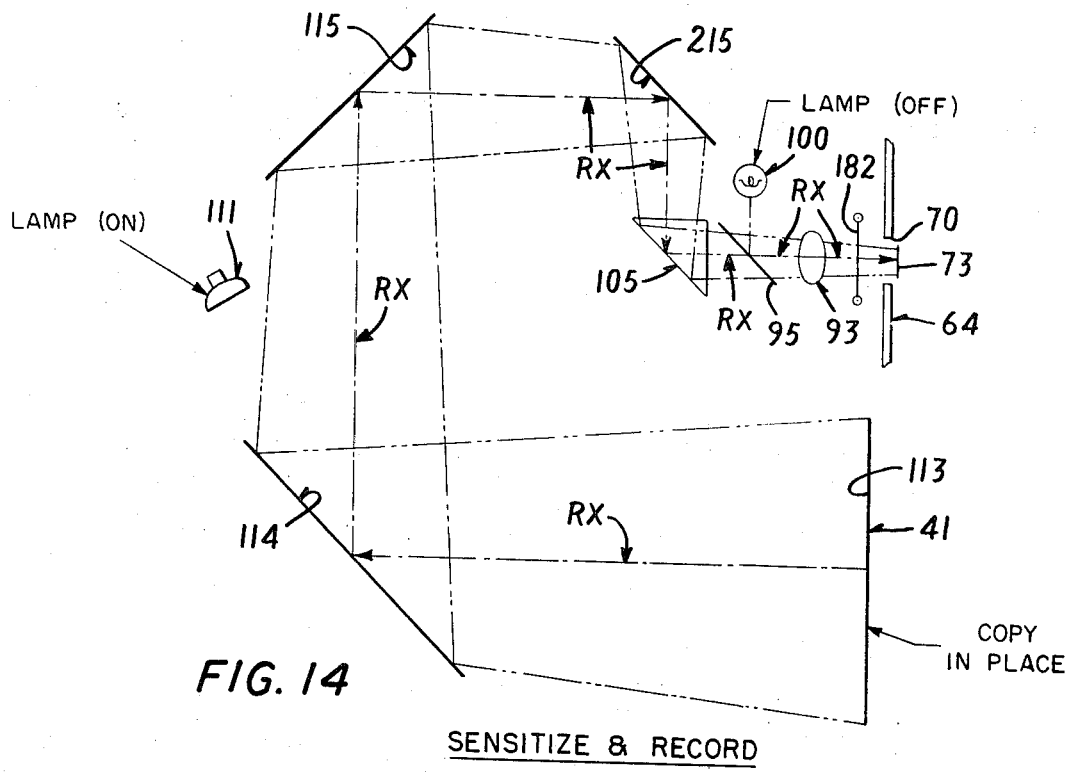
FIG. 14   SENSITIZE & RECORD
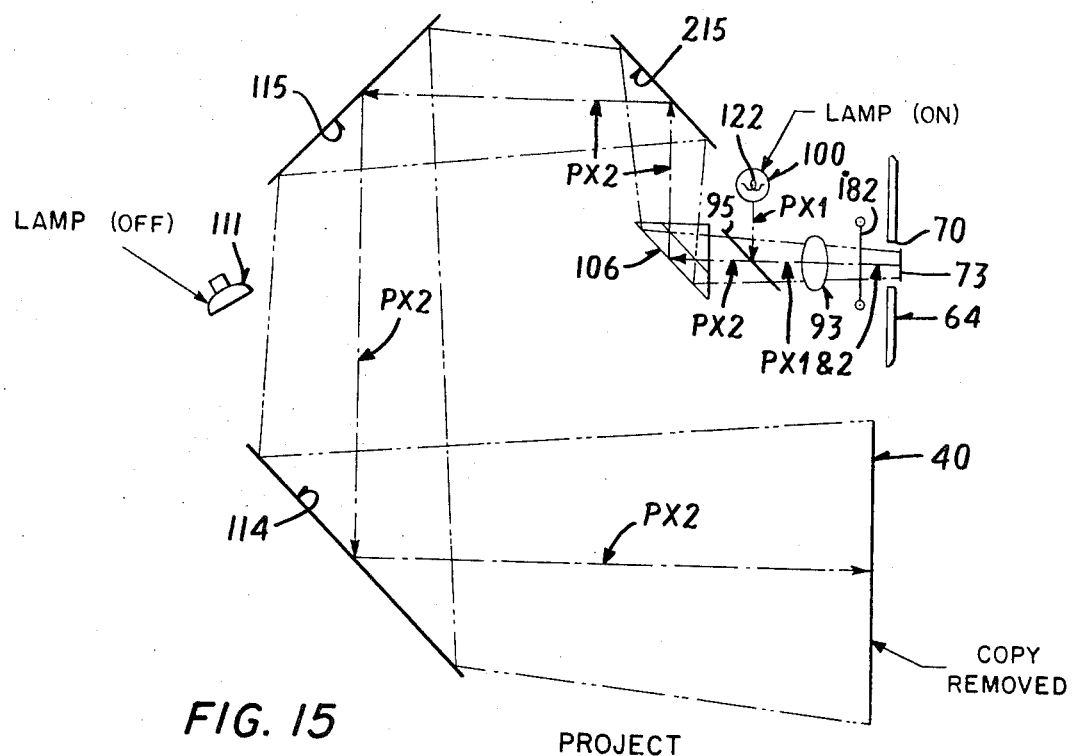
FIG. 15   PROJECT

OPTICAL APPARATUS FOR PRODUCING AND/OR USING PHOTOCONDUCTIVE FILM HAVING A SPECULAR SURFACE SELECTIVELY DEFORMED IN IMAGE AREAS THEREOF

SUMMARY

The present invention relates to apparatus for producing photoconductive thermoplastic film having a specular surface in which images are to be recorded by rippling the darker portions thereof when such images are imposed thereon and for projecting therefrom to a viewing screen replicas and such image patterns.

Prior to the present invention it has been proposed by the U.S. Wolff Pat. No. 3,547,628 and Gaynor U.S. Pat. No. 3,291,601 to produce such film, in a three-ply form, which is transparent for transmitting image-projecting light rays therethrough. Both of these patents propose transporting such a transparent film successively through at least four stations. At the first station (1) a uniform electrostatic charge is applied to the heat deformable photoconductive face ply. At the second station (2) this uniformly charged face ply is exposed to a light image for selective discharge by activating radiation of the uniform electrostatic charge in the lighted areas of the image projected thereon. Heating means at the third station (3) applies heat to the face ply to soften it for permitting the image areas which bear residual amounts of the electrostatic charge to deform or ripple. And at the fourth station (4) a schlieren optic projector projects light rays through the so-deformed film to produce a readable replica of the image deformably imprinted on the film. Such systems and the operations thereof are undesirably costly and complicated.

The Lehmann et al., U.S. Pat. No. 3,051,041 proposed apparatus for projecting an image upon a viewing screen of a specular reflecting surface bearing a diffusing pattern of informative or image material. It was concerned with the demand of prior projecting proposals of a large and expensive condenser to project light source rays upon such an imagepatterned surface for reflection back by the latter through an objective lens to the viewing screen. The proposed solution to permit reduction in the size of the condenser was the insertion in the projection beam path of an additional convex or converging lens immediately before the specular surface, to serve as a field lens. While perhaps accomplishing this purpose the Lehmann et al. solution did demand an additional lens, i.e., the large field lens, located so near the image surface as to cause any fouling particles or dust on its surface undesirably to be imaged at the object plane, e.g., on the viewing screen. In a reflective embodiment of the proposed projecting system the illuminating light source is located laterally of the objective lens so that the optical axis of the illuminating beam which is incident upon the record image necessarily is arranged at an appreciable angle to the axis of the projecting, image-bearing beam that is reflected from the record specular surface through the objective lens aperture to the image display screen. Lehmann et al. did not address themselves to a problem of making such axes collinear so as to reduce this intervening angle to zero.

Objects of the present invention are to solve the problems posed by such prior art proposals, among others, and to do so in an efficient and economical manner while assuring new and unexpected, desirable results.

Embodiments of the present optical apparatus produce effectively the desired photoconductive thermoplastic record films which have specular surfaces selectively deformed in image areas thereof, such as microrecordings in the form of fiche or strip film bearing images of record sheets, as well as camera recordings of images of fields of view. Other embodiments project by reflective action to a read-out or display plane faithful replicas of the images defined by the deformations which are temporarily or permanently frozen in such film specular surfaces. Further embodiments which include both of such producing and projecting equipments have been developed that advantageously employ optical elements which are common to such equipments, whereby, for example, microrecordings of successive record sheets may be successively produced in succeeding panels of a plural-panel fiche or successive frames of strip film, reviewed and then if necessary selectively corrected, added to or updated in simple and easily performed manners.

A version of such recorded film producing equipment includes, in combination, means removably to support successively record sheets each having a light-reflective, image-bearing face and means to direct light rays upon the latter, such as one or more suitable flood lighting electrical lamps, and also film supporting means of a light rays-blocking character mounted in a fixed location and having an optical aperture behind which the specular surface of a section of photoconductive thermoplastic film is temporarily supported for exposure in this aperture. This combination further includes optical means to direct a recording image-bearing light beam reflected from the image-bearing face of the supported record sheet to the optical aperture, and in this optical path an objective lens unit that is located a focal distance from the supported record sheet so as to project this beam with the image borne thereby in focus upon the film specular surface exposed in the optical aperture. There is also interposed in this optical path between the lens unit and the optical aperture, in the near vicinity of, but spaced from the latter, means to produce electrostatic charges and impose the electrons thereof upon the exposed specular surface in a latent pattern corresponding to the darker areas of the light beam borne image while this film surface is being irradiated by the photons of this beam. This electrostatic charging means has associated therewith or includes means to heat soften these electrostatically charged film surface areas so that they will be depressed by the electron charges borne thereby, with the resulting deformations in the darker areas becoming fixed or frozen upon cessation of the radiation of the heat energy and cooling of the deformed specular surface of the film.

The electrostatic charging and heating means may be in one of two forms. In one form these means preferably are relatively fine separate filament units transversely arranged in the image-bearing beam path in close adjacency with respect to each other and of such fineness as to avoid interference with the image being imposed upon the film specular surface by this beam. An isolated electrical source of relatively high DC voltage, e.g., ±6,000 VDC, includes the electrostatic charging filament unit as an electrostatic field cathode with a field anode located behind the exposed film specular surface. A separate source of heat generating energy, e.g., ±6 VAC, is connected to the heating filament unit. In the other form the electrostatic charging and heating means is a common filament unit which serves as the electrostatic field cathode that is energized by such a high voltage DC source, and which is connected into a low voltage AC energizing circuit to heat it. The AC heating voltage is superposed as a ripple upon the DC voltage.

Such recording equipment which sensitizes image areas on a specular surface of photoconductive thermoplastic film and then records them by deformation, and the record films produced thereby, have many advantages which are objects of the present invention. Such recorded films require for preservation of the images thereon no special storage environment since light does not affect the permanency of the recorded images, but they may, however, be erased by softening heat. Such film may also be stored in normally lighted areas that are not excessively hot before images are recorded thereon. Recording and processing of such film is accomplished locally, i.e., at a single exposing optical aperture, in a few seconds without requiring liquid chemical processing. Each recorded panel of a plural-panel fiche or each frame of a plural-frame strip film may be visually inspected immediately after being recorded and, if found to be suitable, successive panels or frames may be recorded to realize an "add-on" advantage. Any recorded fiche panel or strip film frame may have its deformed or rippled image heat erased and then replaced by a new recorded image of the same type to realize a corrective or an "up-dating" capability. This film specular surface may be exposed to illumination by an image-bearing, recording light beam for continued irradiation by the photons of the light energy in an image plane of the objective lens before and after image recording thereon by irradiation with the electrons of electrostatic charging energy and the softening radiant heat energy and by the following image freezing upon cooling. The electron image imposed on the film specular surface can reach equilibrium in about one second and the irradiation with heat energy will soften this surface for the deformation recording of the image therein by this time. Image freezing by cooling also requires only about one second. Just as irradiation by light photons may be continuous the irradiation by the charging electrons also may be continuous, to be initiated before and terminated after irradiation by the heat energy, the intermediate pulsing of the heat providing the shutter function. No shutter mechanisms are required by the exposing, charging and heating actions. The light source for the recording light beam need not be pulsed, nor is it necessary to pulse the electronic energy of the electrostatic charging filament although the latter may be desirable to conserve power and increase filament life.

If it is desired to terminate the irradiation of the film specular surface by the charging electrons by the time the irradiation with heat energy is commenced this may be performed simply by employing separate charging and heating elements in front of the film surface exposing optical aperture, in the manner taught in the accompanying drawings, and utilizing the time delay relay to effect energization of the high voltage DC source for creating the electrostatic charging field only during the pre-set period of nonmanipulation of the switches of this time delay relay. During this same period the supply circuit of the low voltage AC source for energizing the film heater will be held open by this time delay relay. Thus, as the time delay relay terminates the energization of the electrostatic charging field the heater can be energized thereby, so that electron and heating irradiation will be successive. The energization of the heater is then suitably terminated after the correct heating period. The source of the image-bearing light beam for irradiating the film specular surface with photons may be energized throughout both of the successive electrostatic charging and heating operations, or it may be limited to the electrostatic charging operation if desired.

This recording equipment may be embodied in a camera version which employs the usual focusing lens unit as the recording objective lens unit. The continuously irradiated in-focus image of the illuminated field of view is projected by a recording light beam that is transmitted by this lens unit to a focal plane which is orthogonal to the path of this light beam at which is located the optical aperture of film holding means where a section of the present specular surface film is to be exposed. The electrostatic charging means is located between the lens unit and this optical aperture and is energized so that the optical aperture is irradiated simultaneously with photons of the image-bearing light beam and electrons of the charging field. Then, when desired, a section of the film specular surface is exposed at the optical aperture to such combined irradiation for any desired period, e.g., more or less than a second, so that an electrostatic charge proportionate to the light and dark portions of the image is developed in equilibrium in this surface. This electronically charged surface is then heat softened while the combined irradiation is continued and the radiation of heat energy to the film specular surface is then terminated to allow the latter to cool for freezing the deformed image therein. No critical timing of these functions is required since the recorded image cannot be erased by too much heat while the irradiation by the charging electrons and by the light photons is continued.

In projector equipment for optically using such film having its specular surface selectively deformed in image areas thereof to project to a read-out plane, such as a viewing screen, images of these deformed image areas, a similar or the same optical aperture defining structure is employed for supporting temporarily in a fixed and exposed position a section of the deformed specular surface of such film. Optical means are provided to direct an incident portion of a projecting light beam along a path to this exposed film surface section which includes, in optically forward succession along the axis of the path of this beam portion, an activatable light source, a beam splitter and an objective lens unit. The light source is located at a first focal point of this lens unit with the latter adapted essentially to collimate the bundle of light rays of this beam portion between the lens unit and the optical aperture. An additional reflective portion of the projecting light beam is directed along a path from such film specular surface, that is exposed in the optical aperture, to a viewing screen, this reflective beam portion including in optical forward succession along the axis thereof the same objective lens, which receives from this aperture an essentially collimated bundle of the light rays of this reflective beam portion, the same beam splitter, and an amici prism. The amici prism is located optically forward beyond a second focal point of the objective lens unit with this second focal point being optically forward of the beam splitter. One of these incident and oblique reflective beam portion paths is incident upon the reflective surface of the beam splitter with the other thereof extending through the latter.

In this projector equipment energizable heating means is located between the objective lens unit and the optical aperture, in the near vicinity of the latter, selectively to heat soften the portion of the image deformed specular surface of the film that is exposed in this aperture when such film is located in the focal plane of the latter, for erasure by surface tension of the deformed image areas of the heat softened film portion.

The light source of this projector equipment preferably is an in-focus image of an energized light filament with this image located at the first focal point of the lens unit. A light-rays blocking, apertured mask is located in an orthogonal plane relative to the path of the incident projection beam portion at this first focal point of the objective lens unit, so as to flank opposite sides of this in-focus light source image. When this light source is activated, so that the objective lens unit forms an in-focus image thereof at the second focal point of this lens unit between the beam splitter and the amici prism, it is preferable that a light-rays baffle be located in an orthogonal plane relative to the path of the reflective projection beam portion at this second focal point. It may be desired that when such mask at the first focal point is of a type having a relatively small round aperture, in which the light source image will be in focus at the first focal point, and the baffle is embodied in the same projector equipment this baffle will have a round target at the second focal point with the target area being about the same size as the mask aperture. The axis of the path of the incident portion of the projection beam and that of the path of the reflective portion of this beam respectively extend centrally through the mask aperture and the baffle target. When the target area of the light baffle is a relatively small round aperture in a light-rays blocking structure the following pertains thereto. Such of the incident rays of the projection beam light bundle, that is essentially collimated by the objective lens, which strike the undeformed areas of the film specular surface, which flank the deformed image areas of the latter, together form an essentially collimated bundle thereof which is reflected back through the objective lens unit to be converged at the baffle aperture for passing through the latter to constitute the reflective projection beam portion that passes on to the read-out plane or viewing screen. Incident rays of this essentially collimated bundle which strike the deformed image areas of the film specular surface are reflectively deviated to strike the light-blocking surfaces of the baffle which flank the target area aperture, so as to be blocked out. As a consequence, the film deformed image areas appear as dark portions on the viewing screen while the undeformed image areas appear as brightly illuminated portions. The resulting composite image on the viewing screen is a positive image and thus this apertured baffle is identified as a positive baffle. If it is desired to record a photographic hard copy or negative the baffle used will be a negative baffle the target area of which is opaque to block out the undeviated light rays with the baffle structure flanking this opaque target area being transparent to pass the deviated light rays therethrough on to the viewing screen, so that the deformed image areas appear as brightly illuminated portions of the projected image. It is thus desirable that positive and negative baffles be interchangeable on the mount therefor.

As is understood in this art the amici prism is employed properly to erect the projected image and rearrange the parts thereof so that right hand and left hand portions of the original image being projected respectively will appear as the right and left hand portions of the projected image. Thus, when the original image is text on a record sheet it is readable in the projected image displayed on the viewing screen.

A desirable embodiment of the optical apparatus of the present invention combines the recording and projecting equipments that are previously described. Such combination embodiment is particularly useful as a microrecording system for producing small-scale photoconductive and thermoplastic record films having specular surfaces selectively deformed in image areas which are replicas of data or message images on original, relatively large, record sheets. In combining these two equipments in a unitary optical apparatus the structure which supports unexposed or blank microfilm at an optical aperture for recording deformation or rippled image areas on portions of the specular surfaces thereof alternatively is used to support the so-recorded microfilm for projecting to a read-out or display station there for viewing easily readable, enlarged replicas of the recorded images. The viewing screen used in the projecting mode at the display station also is embodied in the record sheet holder which is employed in the recording mode. Additionally, the viewing screen is useful for observing the progress and effectiveness of the recording action as it progresses. The single objective lens unit is commonly employed in both of the recording and projecting modes. While the electrostatic charging and heating means between the optical aperture and the objective lens unit is necessary only to the recording mode the fixed location thereof in the optical path of the projecting image-bearing beam does not undesirably interfere with the effective function of the latter. The beam splitter is also primarily useful in the projecting mode, but its fixed position in the optical path between the optical aperture and the combined record sheet holder and viewing screen does not interfere with the passage in the reverse direction of the recording beam from the latter to the former. In fact, in one version of this combination embodiment the beam splitter usefully may serve as a recording beam turning mirror to facilitate compactness of the beam path. Separate light source lamps with their on-and-off controls are used for the recording and projecting modes, i.e., a "copy" lamp for illumiating the record sheet at the display station and a projecting light source lamp for producing the projecting beam. The conventional beam turning prism which is employed in the recording mode and the amici prism which is useful only in the projecting mode may be mounted upon a common movable mount or support for alternate insertion into the common beam path between the display station and the beam splitter. Conveniently, this common movable support may carry the light baffle in front of the amici prism so that when the latter is moved by the support the latter will simultaneously insert both this prism and baffle into the common beam path for the projecting mode and remove them therewith for the recording mode. Also the on-and-off controls for the copy and projecting light source lamps advantageously may be manipulated by the motion of this prism support alternately to energize these lamps for the recording and projecting modes.

The photoconductive thermoplastic film having a specular surface which is to be or has been deformed selectively in image areas thereof, that is to be prepared or used by versions of the apparatus of the present invention, may be plural-ply "Reflective Photoplastic Film" obtainable from the General Electric Company. As such, it is a sandwich of a dielectric plastic base layer; an intervening electrically-conductive ground layer; a photoplastic upper layer in which are combined a photoconductor and a thermoplastic; and a highly reflective, thin, metallic overcoat. Since the base and ground layers perform no service, other than to give body to the film, in the use of such film in the present apparatus, and since the metallic overcoat is not necessary, a simple single-ply opaque film which has the necessary photoconductive and thermoplastic characteristics is ideal. The generally specular image surface thereof, after recording, contains data or image information in the form of deformations consisting of tiny ripples flanked by essentially flat mirror-like surface areas. Light that is reflected from such a recorded surface contains both noise light (having a uniform level with no angular diversion of reflected rays) and signal light (rays that are diverted at various angles).

The projecting system of the present invention is well adapted to project a variety of types of images, such as density images, diffusion images, defraction images, refraction images and the deformation images. For porjecting these different types of images, except density images, in highly approved manner, masks of various types best suited to each particular purpose, are easily inserted into the projecting optical system. Density image projection requires no masking. The present beam splitter optical arrangement, which allows true coincidence of the axes of the common incident and reflective portions of the projection beam, permits maximum versatility of the masking arrangement, since thereby the light source image in the reflective beam portion which extends optically beyond the beam splitter to the read-out or display plane is located in free space rather than being closely offset laterally of adjacent structure.

Since the present projecting system is so well adapted to projecting deformed images from opaque, photoconductive and thermoplastic film inexpensive manufacture of plural-panel fiche readily is attainable.

Other objects of the invention will in part be obvious and will in part appear from reference to the following detailed description taken in connection with the accompanying drawings, wherein like numerals identify similar parts throughout, and in which:

FIG. 1 is a top plan view of an embodiment of the optical apparatus of the present invention which combines recording and projecting equipment for producing and using microrecording photoconductive thermoplastic film that has a specular surface which can be or is selectively deformed in image areas thereof, broken lines being used to depict the recording image-bearing beam from a supported data or information bearing record sheet and to indicate the open position for the record sheet holder;

FIG. 7 is a sectional view taken substantially on line 7—7 of FIG. 1, showing the dual prism mount and light baffle in side elevation;

FIG. 8 is an enlarged plane view of a plural-panel film fiche which is somewhat similar to that shown in FIG. 2;

FIG. 9 is an enlarged sectional view, with parts broken away, taken substantially on line 9—9 of FIG. 8;

FIG. 10 is a view similar to FIG. 5 of a variation of the combined electrostatic charging field electrode and film heat softening means employable in the optical system depicted in FIG. 6;

FIG. 11 is a diagrammatic view of the portion of FIG. 6 which depicts the optical aperture at which a recorded film is mounted for projecting an image-bearing beam therefrom, including the objective lens, and the sources of energization of the electrostatic charging field and radiant heat as demanded by the structural variant of FIG. 10;

FIG. 12 is a simplified diagrammatic layout of the optical system of the FIGS. 1 to 4 incl. apparatus as conditioned for sensitizing and recording a blank film section at the optical aperture;

FIG. 13 is a diagrammatic view similar to FIG. 12 showing the optical system in the projecting mode;

FIG. 14 is a diagrammatic view similar to FIG. 12 showing a variant of the optical system in the sensitizing and recording mode;

FIG. 15 is a diagrammatic view similar to FIG. 13 showing the optical system of FIG. 14 in the projecting mode;

Figure 16:
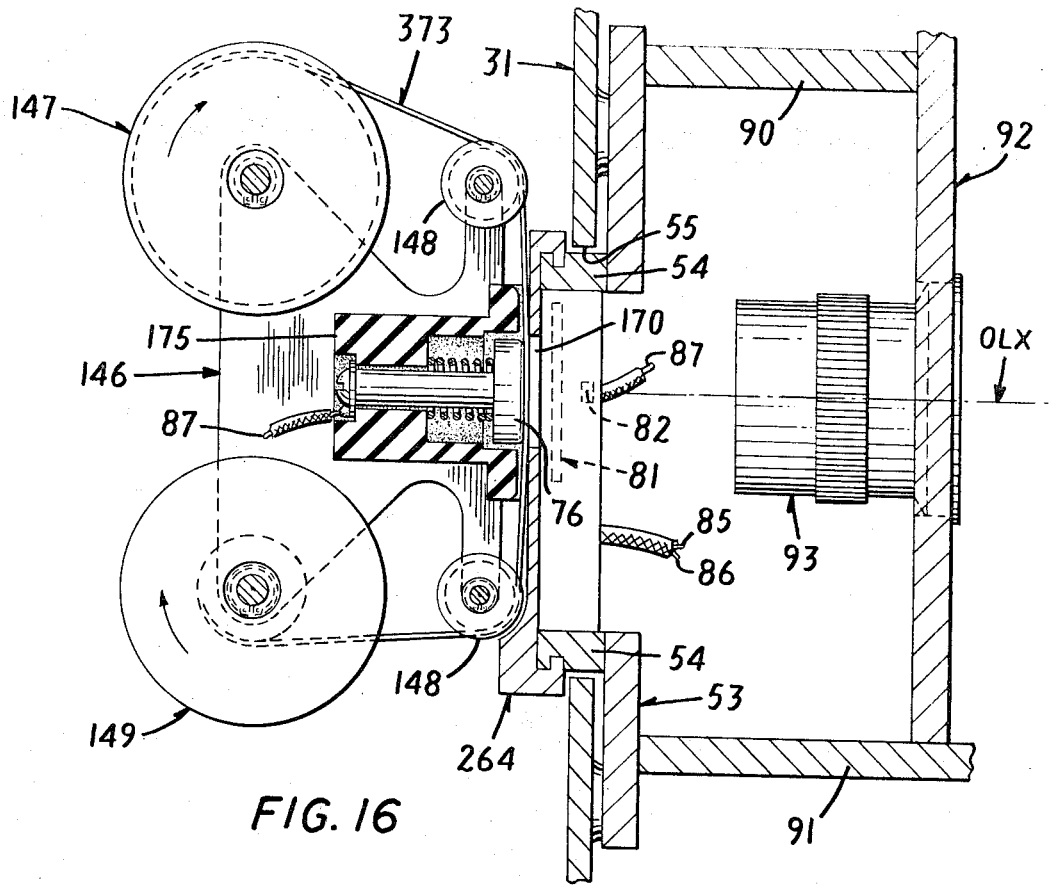
Figure 17:
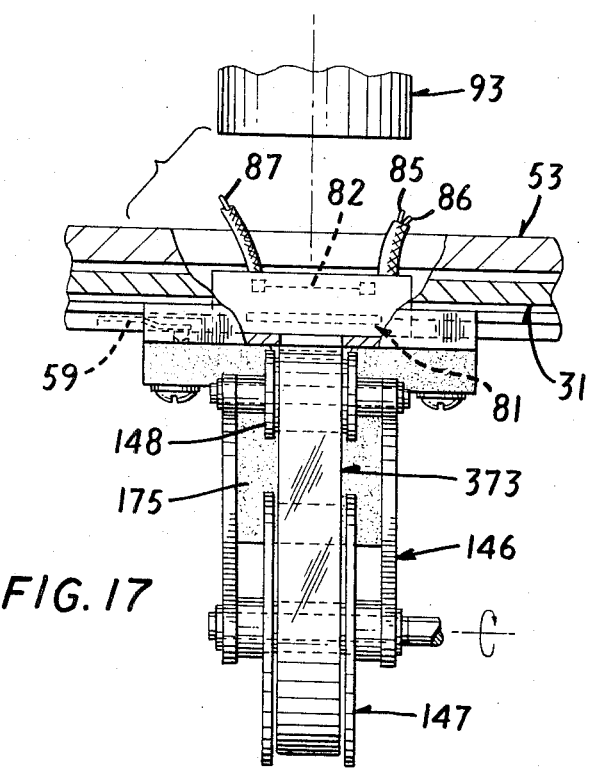

FIG. 16 is a sectional view, with some parts broken away and others shown in plan, of structure of the apparatus depicted in FIGS. 1 to 4 incl. with the substitution at the optical aperture of a device for successively translating a plural-frame strip film frame-by-frame through the focal plane at the optical aperture; and FIG. 17 is a side elevational view, with some parts broken away and in section, of the structure shown in FIG. 16.

Figure 1:
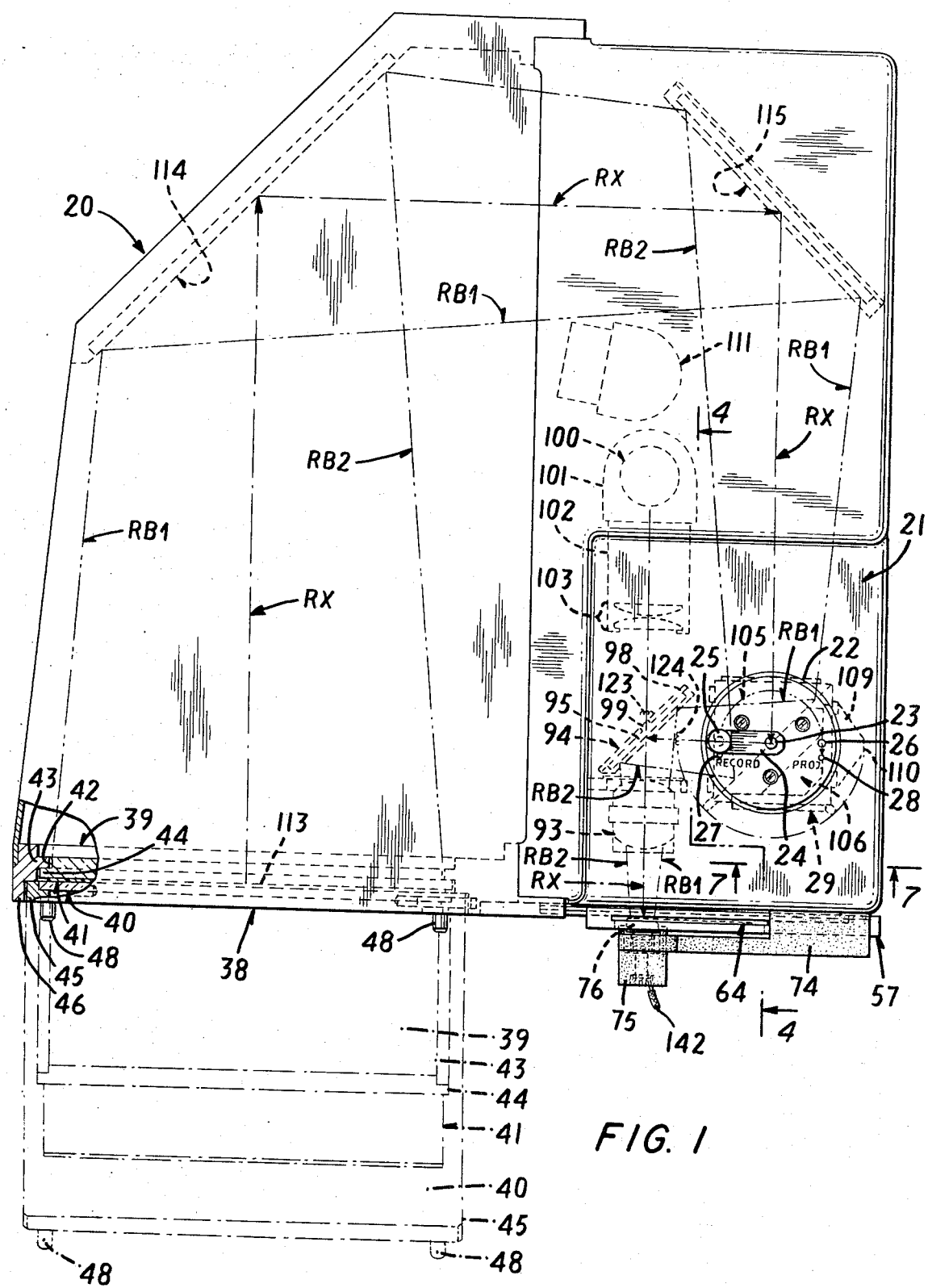
Figure 2:
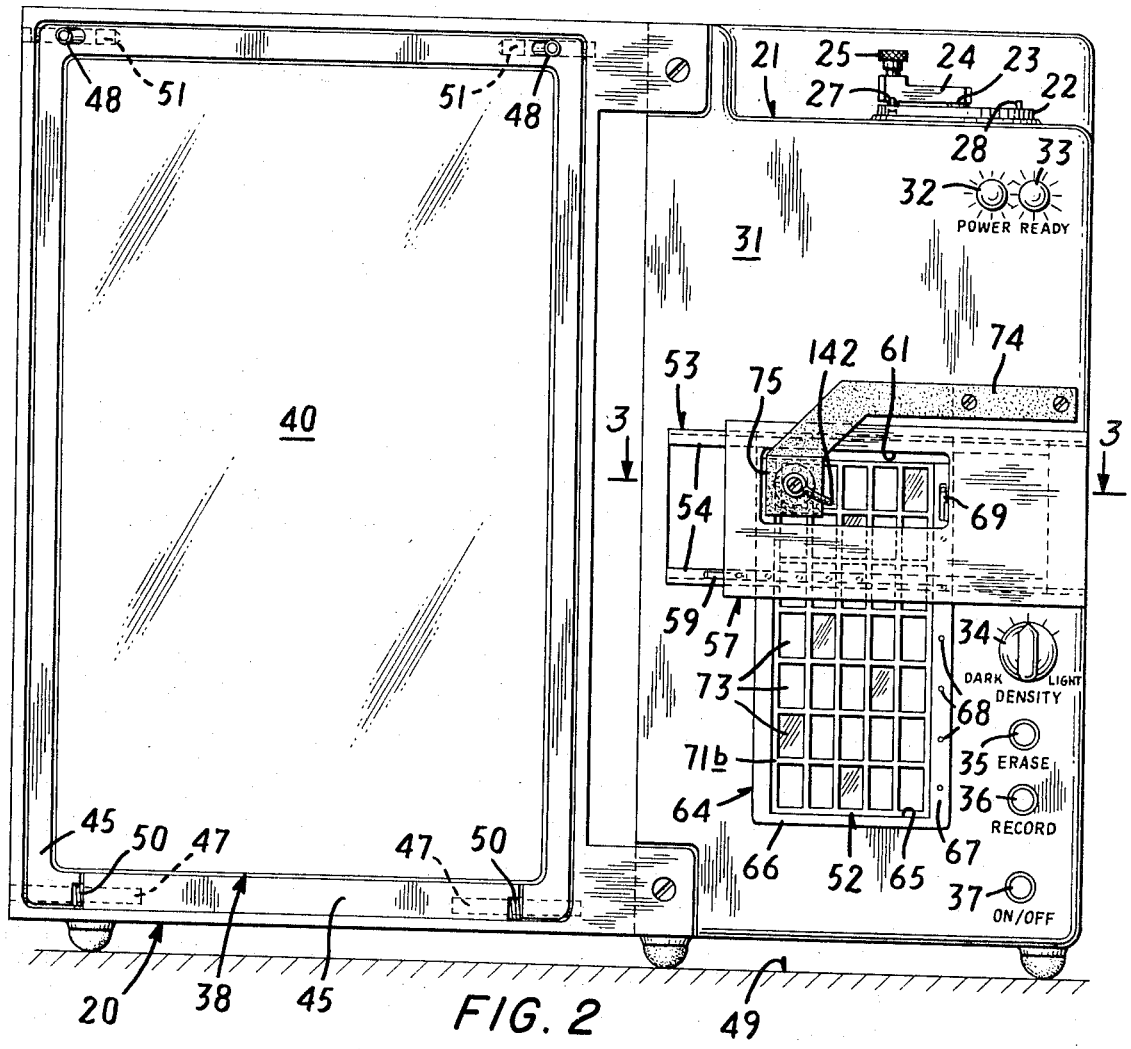
FIG. 2 is a front elevation of the apparatus depicted in FIG. 1.
Figure 3:
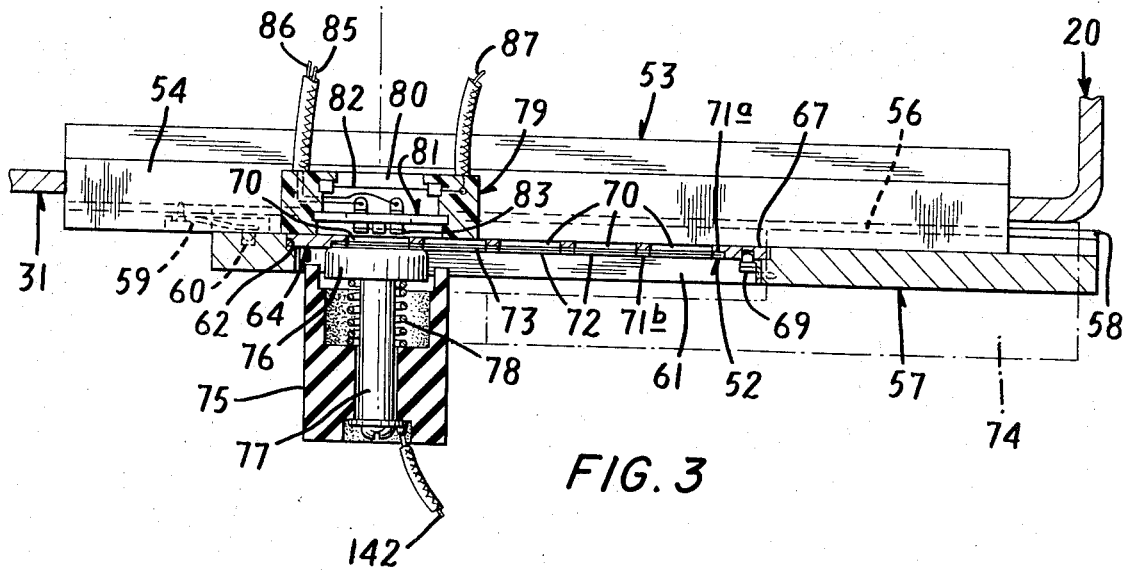
FIG. 3 is an enlarged sectional view, with parts broken away, taken substantially on line 3—3 of FIG. 2.
Figure 4:
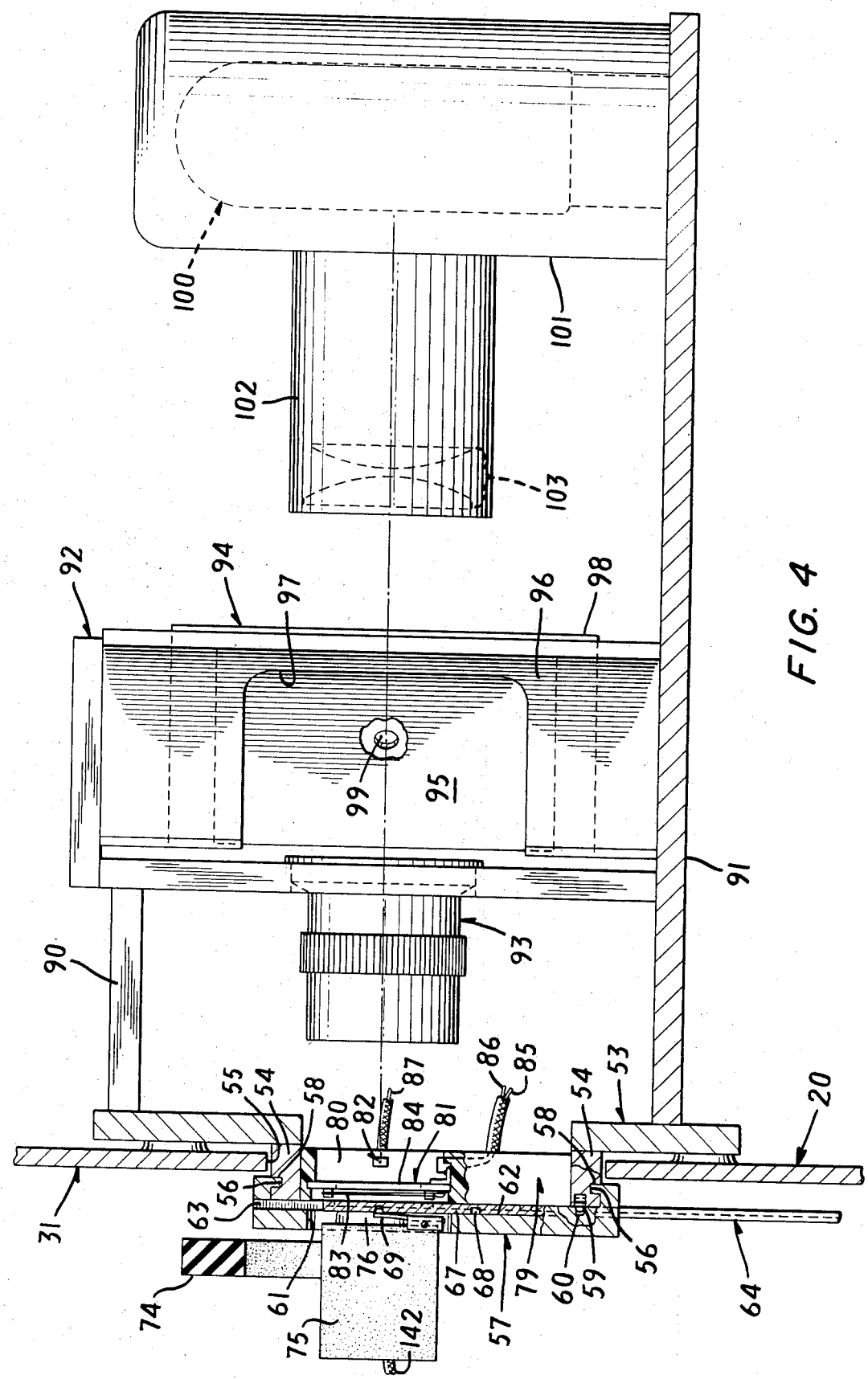
FIG. 4 is an enlarged sectional view, with some parts in elevation and others broken away, taken substantially on line 4—4 of FIG. 1.
Figures 5, 6:
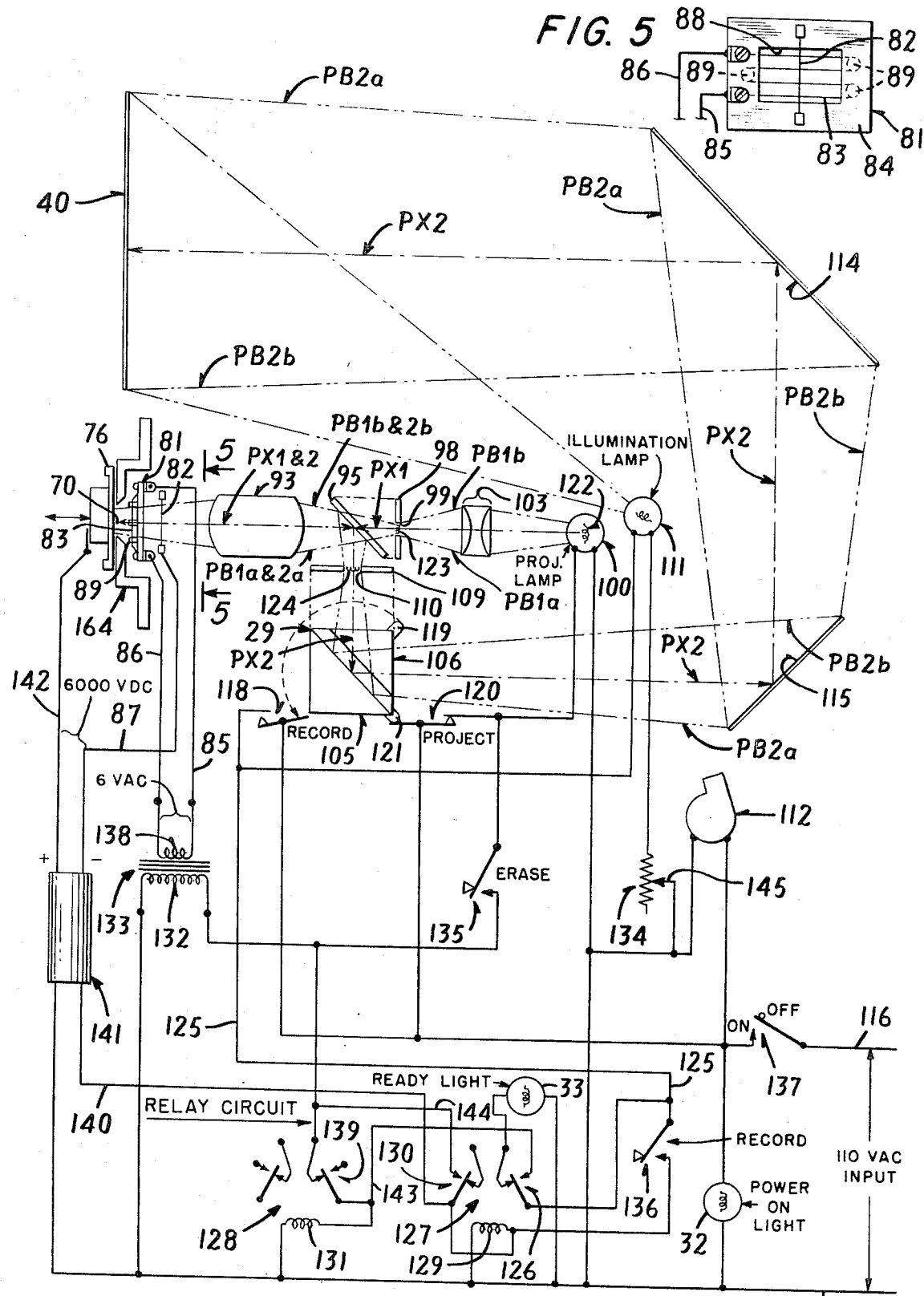
FIG. 5 is a plan view of a combined electrostatic charging field electrode and film heat softening means employable in the optical system depicted in FIG. 1.
FIG. 6 is a diagrammatic layout of the optical and electrical systems of the FIGS. 1 to 4 incl. apparatus employing the electron and heat energy sources of FIG. 5, showing the projecting mode of this apparatus.

The apparatus of FIGS. 1 to 4 incl. includes a compact housing 20 in which is encased the optical system and the electrical circuitry depicted in FIG. 6, and on which are supported externally thereof the controls and plural-panel film fiche translating means shown in FIGS. 1 and 2. As will be seen from FIGS. 1, 2, and 7, a depressed top panel 21 of the housing 20 is equipped with a dial plate 22 up through which a shaft 23 extends centrally to carry, fixed thereto, on its top end a selector crank arm 24 equipped with a spring-biased knob 25 with which this crank arm may be swung through an arc of about 180° for indexing the spring-biased pin of this knob into a pair of indexing holes for the "Record" and the "Project" positions, the "Project" hole 26 being indicated in FIG. 1. In order to avoid overswing of this crank arm 24 between the "Record" and "Project" positions stop pins 27 and 28 are carried by the top of the dial plate 22. As will be best understood from FIGS. 1 and 7 the crank shaft 23 is fixed to a prism holder 29 for rotation thereof by the crank arm 24, and this prism holder is pivotally supported by a pair of frame plates 30.

As will be understood from FIG. 2 the front end of the housing 20 is provided with a right hand panel 31 "Power" pilot light 32 and a "Ready" pilot light 33. This front end panel 31 also carries a rotary rheostat control knob 34, an "Erase" push button 35 for a normally open switch, a "Record" push button 36 for a normally open switch, and an "On/Off" push button 37 for a normally open power switch. The power switch, which is controlled by the push button 37 is of the type which initially closes the power supply circuit when first pushed and then opens this circuit when again pushed, with this cycle then being repeated upon successive depressions of this button.

The front end of the housing 20 also is provided in the left hand section thereof with a hinged record sheet holder 38. As will be understood from FIGS. 1 and 2 this record sheet holder includes a pair of platens 39 and 40 between which may be clamped a record sheet 41 when in the closed position, and they are clamped together by the latching thereof. For this purpose, the inner platen 39, that is made from transparent, ray-transmitting material, such as a suitable plastic, has its edges rabbeted so that an inner land 42 thereof will nest within the rectangular opening of a housing frame flange 43 (FIG. 1), and a laterally extending flange 44 of this transparent platen will abut against the outer side of the frame flange 43. The outer, larger platen 40, which is in the form of a conventional viewing screen that permits observation from the outer side of an image projected to the inner face thereof, has a rectangular frame 45 which nests within a rectangular recess in housing frame 46. Both platens 39 and 40 are hingedly supported upon hinge pins 47 to permit individual swinging drop thereof when they are unlatched from the housing, with the hinging being of a type to permit them to spring apart for ready reception therebetween of any such record sheet 41, such as is indicated in broken lines in FIG. 1, with leg pins 48 mounted on and extending outward from the top of the viewing screen frame 45 for resting upon a suitable support surface 49 (FIG. 2). For this purpose of automatic springing apart of the transparent platen 39 and the viewing screen platen 40 the hinges 50 may be in the form of coil springs having one end of each anchored to the viewing screen platen and the other end of each anchored to the transparent platen. The latching means, shown in dotted lines in FIG. 2, may be in the form of spring-biased bolts 51 carried by the top of the viewing screen frame 45 with their noses adapted to index into sockets in the housing frame 46, and the retracting knobs for such bolts may be separately provided or as the leg pins 48.

Since it may be desirable to provide the unrecorded film sections for the recording mode or recorded film sections for the projection mode in the form of panels of a plural-panel fiche, illustrated at 52 (FIGS. 2 and 3), which is to be manipulated from panel to panel exteriorly of the housing 20, its mount and the mechanism for so manipulating it are supported exteriorly on the housing panel 31. As will be understood from FIGS. 2, 3, and 4 this support and manipulating mechanism may be in the form of horizontal track structure 53 fixedly mounted to the inner face of the housing panel 31 with horizontal rails 54 thereof extending out through a slot 55 in this panel. Exterior of the housing panel 31 the track rails 54 are provided on their outer sides with guide grooves 56. A transverse slide 57 is provided which carries along its top and bottom edges inwardly extending flanges which terminate in inwardly turned and opposed slide lips 58 that slidably fit into the guide grooves 56 for horizontal transport of this slide. One of the track rails 54 may be provided with a spring-biased detent 59 which will selectively index into any one of a series of recesses or sockets 60 that are provided in a horizontal row in the back face of the slide plate 57, so that spaced vertical zones thereof may be successively moved to alignment with an optical exposing aperture to be explained later. A horizontally elongated hole 61 is provided in this horizontal slide plate 57 and the back face of the latter is provided with a vertical groove 62 with which is aligned slots 63 extending through the top and bottom side edge flanges.

A vertical slide plate 64 is provided which is slidably mounted in the vertical recess 62 and the aligned slots 63 of the horizontal slide plate 57. The outside face of this vertical slide plate 64 is provided with a shallow recess 65 having a transverse abutment ledge 66, so that the plural-panel fiche 52 may be nested in this recess with its bottom end edge resting upon the ledge 66. This recess 65 is flanked on one side by a vertical land 67 which has a series of recesses or sockets 68 provided therein into which may be selectively indexed another spring-biased detent 69 carried by the horizontal slide plate 57, preferably by being mounted on an end edge of the horizontal slide plate opening 61 (FIG. 3). It will be understood from FIG. 3 that the recessed portion of the vertical slide plate 64 is provided with optical apertures 70 which will be aligned with the film panels exposed in the framing of the plural-panel fiche 52, for imposition of image-bearing light beam photons, electronic charging field electrons and heat energy to any selected one of such film panels as may be aligned with the optical aperture in use in any particular recording operation.

In order to understand the manipulative action of the horizontal slide plate 57 and the vertical film fiche-supporting slide plate 64 let the following be assumed with respect to this plural-panel fiche 52. The fiche 52 may consist of a sandwich of two outer framing plies 71a and 71b of cardboard or other suitable, relatively stiff sheet material which may be of a suitable plastic having a melting temperature higher than the heat that will be imposed on this fiche at the optical aperture in the recording mode. These framing plies will be provided with a plurality of like rectangular windows 72 which may, for example, be arranged in seven horizontal rows and five vertical rows. The vertical plate optical apertures 70 will be aligned with these fiche windows 72 when the fiche card 52 is nested in the vertical plate recess 65. The intermediate ply of the fiche 52 is a sheet of photoconductive thermoplastic film which has a specular suface that can be selectively deformed in image areas thereof and it is interposed between the two framing plies 71a and 71b with the plies of this sandwich being securely anchored together by any suitable means such as known types of adhesive. Thus each window of the fiche framing and the aligned optical apertures in the vertical slide plate 64 will expose one of the panels 73 of the fiche in such optical aperture of the apparatus when aligned with the light beam path of the latter.

Let it be assumed that the upper left hand fiche film panel is numbered "1" and that those in the top row are successively numbered "1," "2," "3," "4," and "5." Those in the second row from the top will be numbered "6" to "10" incl., and this successive numbering will continue horizontal row by horizontal row for all of the fiche windows 73. Beginning with the upper left hand corner film panel "1" of the plural-panel fiche 52 the horizontal slide 57 will be manually adjusted laterally to the position indicated in FIG. 2 to be held by its catch 59. The vertical slide plate 64 will be manually adjusted to the vertical position depicted in FIG. 2 to be held by its catch 69, to align this first film panel and the vertical slide window therebehind in alignment with the optical beam path axis of the apparatus. Recording of an image on this first film panel will be accomplished in a manner indicated hereinafter and then the horizontal and vertical slides 57 and 64 will be employed progressively to record images on the succeeding film panels.

Also, exterior of the housing 20 its front panel 31 suitably supports a bracket arm 74 which carries an electrode-supporting head. This electrode may constitute the anode of an electrostatic charging field electrical circuit and, as will be best understood from FIG. 3, it may be in the form of a metallic pressure shoe 76 which has a guiding stem 77 slidably mounted in a bore in this head and spring biased forward by a compression spring 78. The pressure shoe 76 is of a size and shape as to make contact with that portion of the fiche framing ply 71b which surrounds the window in which the film panel to be recorded is mounted. The aperture 70 in the vertical slide 64 and the opposed portion of the fiche frame window 72 beyond the selected film panel 73 together consitutes the optical aperture of the optical system of the film recording equipment, so that the specular surface of the film panel thereat is located or exposed in the focal plane of this optical system with the pressure shoe anode 76 located immediately behind this film panel. Since the energizable electrostatic charging circuit is to be isolated from other electrical circuitry of the recording equipment of the apparatus in the FIGS. 5 and 6 form at least the bracket head 75 preferably should be formed of suitable insulative material. For convenience the entire bracket 74 including its arm and this head may be made of relatively strong and rigid insulative material, but it is to be understood that it may be of other structural material with the electrode supporting stem 77 and the biasing spring 78 suitably insulated therefrom.

As will be best understood from FIG. 4 the track defining structure 53, particularly its flange rails 54, may serve as means for anchoring between the latter a support head 79, which may be of suitable insulative material, and which has an opening 80 therein across which is arranged, for support thereby, a heating unit 81 for a source of radiant heating energy, and an electrostatic charging cathode 82. As will be more fully explained hereinafter the source of the radiant heating energy may be an array 83 of reversed turns of fine wire supported by an insulative plate 84 and with this heating wire electrically connected between circuit conductors 85 and 86. The electrostatic charging cathode 82 may be a fine wire which is electrically connected to a circuit conductor 87.

As will be understood from FIG. 5 the electrical heating element 83, its support 84, the electrostatic charging cathode wire 82 and its mounting means may be combined as a single unit. The supporting plate 84 may be in the form of a sheet of suitable insulation, such as Bakelite, having a rectangular opening 88 across which, in one direction are arranged reversed loops of the heating wire 83, which may be draped about suitable pins 89 mounted on one side of this plate. The cathode wire 82 may be mounted by suitable anchorage lugs to the opposite face of this plate to extend normally across the runs of the draped heater wire 83.

Internally of the apparatus housing 20, as will be seen from FIGS. 1 and 4, frame plates 90 and 91 therein support a structural assembly 92 that carries an objective lens unit 93 with its optical axis aligned with the center of the optical aperture at a focal plane where the supported film panel is located, as well as a beam splitter assembly 94. The beam splitter assembly 94 embodies a beam splitter 95 sandwiched between a front holding plate 96, that has a side notch 97 to allow free passage of a light beam, and an opaque back plate 98 which serves as a mask and has a mask aperture 99 therein. The mask aperture 99 has its center axially aligned with the axis of the objective lens unit 93. For the purpose of the projection mode of the apparatus the frame plate 91 carries a housed electrical light source or lamp 100. Lamp housing 101 is provided with a tubular light outlet 102 in which is mounted a condenser lens assembly 103 which has its axis aligned through the center of the mask aperture 99 with the axis of the objective lens assembly 93.

As will be seen from FIGS. 1 and 7 the rotary prism holding structure 29 includes a pivotally supported frame 104 in which is assembled a conventional prism 105, which in cross-section is the shape of a right angular isosceles triangle, and an amici prism 106, that may be a roofed isosceles trapezoid, with the oblique faces of these prisms abutted. Suitable holding frame plates, one of which is shown in elevation at 107 in FIG. 7, are provided with relatively large holes, such as 108, to permit free passage of the light bundles into and out of the prisms. Opposite a side face of the amici prism the holder is equipped with a frusto-conical baffle 109 having an approach target area 110, and it is removably supported by the frame structure 104 for ready substitution of different types thereof.

It will be seen from FIGS. 1 and 6 that a record sheet illuminating or copy lamp 111, of the electrically energized type, is also suitably mounted within the housing 20, to serve as a source of illuminating light rays either for direct or indirect reflective radiation to the closed record copy holder 38 and the face of the record sheet 41 mounted therein. It is desirable that a heat-dissipating device, such as an air blower 112 (FIG. 6), also be mounted suitably within the housing 20, at a location outside of beam paths therewithin to circulate cooling air past the projecting and illuminating lamps, and to prevent accumulation of excessive heat in the vicinity of film exposed at the optical aperture when such film carries a recorded image for projecting action. For this purpose suitable air inlet and outlet openings or light-baffled grills may be provided at proper locations in housing wall sections, such as sections of the bottom wall structure which are spaced minor distances from the apparatus-supporting surface 49 by relatively small feet. So locating air inlet and outlet openings will tend to exclude ingress of room light so as to enhance the sharpness of images projected upon the viewing screen 40, although the present apparatus is capable of effective operation in normal room illumination.

In FIG. 1 is further illustrated optical equipment which is mounted in the housing 20, and which defines with the objective lens unit 93, the beam splitter assembly 94, the projecting light source 100 and its condenser lens assembly 101, the prism mounting assembly 29, and the combined record sheet holder and viewing screen structure 38, the optical beam paths. This additional optical equipment includes, and intercepting successively the axis "RX" of the path of the recording optical beam, a first, right angle-turning oblique mirror 114, and a second similar oblique mirror 115, which intervene the data or information bearing face 113 of the holder-supported record sheet 41 and the ordinary beam-turning triangular prism 105. The margins of this path of the recording beam for the recording mode are indicated in broken lines at "RB1" and "RB2" in FIG. 1. The diagrammatic showing in FIG. 12 of the optical layout of the recording mode may facilitate a more ready understanding of this recording system.

FIG. 6 diagrammatically illustrates the projecting optical system of the FIGS. 1 to 5 incl. and 7 apparatus and electrical energizing circuitry and equipment suitably encased in the housing 20 of this apparatus for use in the projecting mode thereof. A more ready understanding of the optical system thereof may be had from the diagrammatic showing in FIG. 13.

As will be seen from FIG. 6 the power input, which may be 110VAC, may be connected to input conductors 116 and 117 with the latter including an on-and-off switch 137 controlled by push button 37, so that when the latter is depressed this switch is closed and the next depression thereof opens this switch. The input conductor 116 is connected beyond the switch 137 to a normally open recording switch 118 which will be tripped closed by a switch operating finger 119 of the rotary prism assembly 29. Thus when the latter is rotated by the selector crank arm 24 to insert the ordinary triangular prism 105 into the optical system this recording switch 118 will be held closed thereby, for the recording mode as in FIG. 1. The input conductor 116 beyond this switch 137 is also connected to a normally open projecting switch 120 which, when the rotary prism assembly 29 is manipulated by the selector crank arm 24 to the projecting mode, as is indicated in FIG. 6, to insert in the optical path the amici prism 106, a switch operating finger 121 carried thereby closes and holds closed this projecting switch. Consequently, the closed projecting switch 120 shunt connects the projecting lamp 100 across the power supply line, while the illumination or copy lamp 111 is deenergized at the open recording switch 118. It is obvious that, since the recording and projecting switches 118 and 120 are alternately closable by the manual setting of the prism assembly 29 the normally open projecting switch will be permitted to open for de-energizing the projecting lamp 100 as the normally open recording switch 118 is closed by the manual swing of the prism 105 into the optical path for the projecting mode.

With the normally open projecting switch 120 held closed by the "Project" position of the rotary prism holder 29 the energized projecting lamp filament 122 causes a beam of light to be transmitted along the axis "PX1" toward the rear side of the beam splitter 95 through the condenser lens assembly 103 to project in the mask aperture 99 at the focal point of the latter a first in-focus image 123 of this energized lamp filament for serving as the light source in the projecting mode. The first portion of the projecting beam thus passes directly through the oblique beam splitter 95 and along the common axis "PX1 & 2" through the objective lens unit 93 directly to the optical aperture 70 at which the recorded surface of a film section is exposed in an orthogonal plane relative to this axis. The light rays of this projecting beam first portion which extends from the objective lens unit 93 to the optical aperture are essentially collimated. Those which impinge upon undeformed portions of the exposed film surface are reflected back in an initial section of the second portion of the projecting beam in an essentially collimated bundle to pass back along the common axis "PX1 & 2" through the objective lens unit 93 to the oblique reflecting surface of the beam splitter 95. This second portion of the projecting beam is then turned by the oblique reflective face of the beam splitter through a normal angle to form a second in-focus image 124 of the energized projecting lamp filament in the target area or aperture 110 of the light baffle 109. Such of the light rays in the essentially collimated bundle thereof which strike the deformed or rippled areas of the recorded film surface are deviated so that this second projecting light beam portion will include as a borne image only the light rays which are substantially undeviated to pass through the baffle target area or aperture 110, and with the substantially deviated rays being reflected out of the optical system by the opaque portion of this baffle 109 which surround this target area. Thus the image borne by the second portion of the projecting beam will include a replica of the deformed or rippled film surfaces as low illuminated or unlighted areas. The margins of the path of the first portion of the projecting beam which extends successively forward from the energized projecting lamp filament 122 through the condenser assembly 103, the mask aperture 99 and the beam splitter 95 are identified as "PB1a" and "PB1b." Since these beam path margins coincide with those of the margins of the path of the second portion of the projecting beam these common margins are identified as "PB1a & 2a" and "PB1b & 2b." In the manner indicated the second portion of the projecting beam is separated from the path of the oncoming first portion at the oblique face of the beam splitter 95 to travel through the target area 110 of the light baffle 109, and then forward into the amici prism 106. This amici prism then turns the second portion of the projecting light beam through a normal angle along path "PX2" for impingement upon the face of the mirror 115 and then to the face of the mirror 114 for again turning it for impingement upon the viewing screen 40. The margins of the path of this second portion of the projecting beam are identified by "PB2a" and "PB2b."

It is to be understood that the corona wire cathode 82 which is the source of the electrostatic charging field electrons and the electrically energized heating filament 83 are of a fineness as to avoid interference with the image borne by the second portion of the projecting beam, and likewise has no deleterious effect upon the section of the first portion of the projecting light beam which extends forward from the condenser lens unit 93 to the optical aperture 70.

The power supply conductor 116 is connected through the power switch 137 and the closed "Record" switch 118 by a conductor 125 to the "Ready" pilot light 33 through a normally closed switch 126 in a relay circuit which includes a normally open "Record" switch 136 that is momentarily closed by its button operator 36, a conventional relay 127 and a time delay relay 128. In the recording mode, when the "Record" switch 136 is momentarily closed the coil 129 of the relay 127 is energized so that its switch 130 closes the circuit to the time delay relay coil 131 to energize it, simultaneously breaking the circuit at switch 126 to the "Ready" pilot light 33. The closure of the switch 130 of relay 127 energizes the primary winding 132 of a low voltage AC transformer 133. This low voltage AC transformer may have a 6VAC secondary winding 138 which is connected by conductors 85 and 86 to the heating element or wire 83 for producing radiant heat to soften the specular surface of the film section, which is exposed in the optical aperture 70, as it is impinged by the image-bearing recording beam.

This initial supply of energizing power to the primary winding 132 of the step-down AC transformer 133, and the energization of the time delay relay coil 131 resulting from the closure of the switch 130 of relay 127, are accompanied by initial supply of energizing power through conductor 140 to the input of a step-up transformer and rectifier cartridge unit 141. The output of this step-up and rectifier unit is relatively high voltage DC, e.g., ±6000VDC, with conductor 86 thereof connected to electrostatic charging field cathode or corona wire 82 and a conductor 142 thereof connected to the charging field anode in the form of film pressure shoe 76, so as to cause electrons to flow from this cathode to this anode with selective collection of charges of such electrons in the darker portions of the image imposed upon the film photoconductive and thermoplastic surface by the recording optical beam. This DC charging unit may be Model No. 162 manufactured by Venus Scientific, Inc. of Farmingdale, New York.

Release of the momentarily depressed switch button 36, to permit "Record" switch 136 to open again, does not deenergize the coils 129 and 131 of the relays 127 and 128, the AC transformer primary winding 132 and the input of electrostatic charging field cartridge 141 since the closed time delay relay switch 139 acts as a holding switch to receive energizing current directly from the supply conductor 125 through now held closed switch 126 of relay 127 by way of conductor 143. This energizing current is fed back through closed time delay relay switch 139 and conductor 144, which initially supplied energizing current from conductor 125 successively through closed switches 136, 130 and 139, to continue energization of relay coil 129 and also of the high DC voltage cartridge 141 through conductor 140. After the time preset for activation of the energized time delay relay 128 the switch 139 of the latter is permitted to open, so that the relay coil 129 becomes de-energized to break connection to the supply conductor 125 by opening of the switch 126. Consequently, all parts of the relay circuit are permitted to return to their initial positions and conditions with the "Record" manual switch 136 open.

When the electrical circuitry and the optical system are in the projecting mode of FIG. 6 the operator of the apparatus may view upon the viewing screen 40 the projected replica of the image deformed in the film specular surface as exposed in the optical aperture 70. Should he be dissatisfied with the clarity thereof or wish to erase this deformation image recorded on the film specular surface as being unwanted and desire to reuse that film section for the recording of another image he may effect such erasure by pushing the "Erase" button 35. This action closes the "Erase" switch 135 in the electrical circuitry of FIG. 6, so as to energize through held closed "Project" switch 120 and this "Erase" switch 135 the primary winding 132 of the transformer 133, so that its low voltage AC winding 138 will energize the heating filament 83. Heat rediated from energized heating filament 83 softens the deformed specular surface of the exposed film section and surface tension thereof causes this surface to smooth out to a flat plane, thereby erasing the deformed image and conditioning this film section for reuse.

The "Density" control 34 manipulates sliding contact 145 of a rheostat 134 which is in the energizing circuit of the illumination or copy lamp 111. This permits attenuation of the light output of this lamp for light copy or brightens it for dark copy.

As will be understood from FIGS. 8 and 9 the plural panel fiche, here referenced 152 since it constitutes an improvement of the fiche 52 of FIGS. 2 and 3 by doubling the film panel capacity thereof, embodies three windowed frame layers or plies 71a, 71b, and 71c. As in the fiche 52 a continuous ply 173 of the film is sandwiched between the windowed frame panels 71a and 71b to expose in windows 72 of the frame ply 71a film panels 73. The film panels 73 have their photoconductive and thermoplastic specular surfaces facing outward in these frame windows 72. Between the windowed frame plies 71b and 71c another continuous film ply 273 of like character is sandwiched so that like panels 73 of this second film ply have their specular surfaces facing outward and exposed in the windows 72 of this third frame ply 71c. It will thus be understood that the fiche 152 is double-sided so that images may be recorded successively on all of the film panels exposed on one side and then this fiche may be turned over to expose those successively on the other side. The intermediate frame ply 71b contains similar windows 172 which are aligned with the windows 72 in the frame plies 71a and 71c. This latter feature is desirable so as to avoid the presence of heat sink frame ply bodies located back of the film panels 73.

It will be seen from FIGS. 10 and 11 that there may be substituted for the corona filament cathode 82 and the heating filament 83 of FIGS. 4 and 5 a combined cathode and heater 181. A windowed insulative plate 184, which may be similar to that indicated at 84 in FIG. 5, may be employed with a single filament 182 draped back and forth across the window 188 between supporting pins 189, with the low voltage AC transformer secondary winding terminals 85 and 86 connected to opposite ends of this filament.

When such a combined cathode and heater 181 of FIG. 10 is employed in a recording embodiment of the apparatus the step-down secondary winding 238 of the transformer 133 has its terminal wires 85 and 86 respectively connected to opposite ends of the draped filament 182 for heating it. In order that this draped filament 182 may serve as the corona cathode the output negative terminal 187 of the electrostatic charging cartridge 141 is connected to a mid-point of the low voltage transformer secondary winding 238. As in the FIG. 6 embodiment the output positive terminal 142 is connected to the pressure shoe anode 76.

FIG. 12 is a simplified diagrammatic view of the optical system employed by the recording equipment for sensitizing and recording the specular surface of each section of photoconductive and thermoplastic film that is exposed in the optical aperture to a projected beam emanating from the surface of a supported record sheet and with this beam bearing an image of the data or information displayed on the face of the record sheet. It will be noted therefrom that the illumination or copy lamp 111 is so located relative to the record sheet 41 as to illuminate the data or information bearing face 113 thereof. A recording beam is reflected from this record sheet surface along a path having an optical axis "RX" that extends from the center of this displayed record sheet while the latter is supported in an orthogonal plane relative thereto. The margins of the path of this beam are indicated by "RB1" and "RB2." This recording beam is turned 90° by a first oblique first-surface mirror 114 and then again by a second such mirror 115 to be intercepted by the plain prism 105 and again turned by the latter normal thereto to impinge upon the oblique face of the beam splitter 95. The center of this beam splitter is coincident with the optical axis of the objective lens 93 and the center of the optical aperture in which the specular surface of the film section is exposed in a plane orthogonal to this axis "RX."

FIG. 13 is a diagrammatic layout of the optical system of FIG. 12 as it has been conditioned for the projecting mode. It will be seen therefrom that the illumination lamp 111 has been turned off, the projecting lamp 100 has been energized, the amici prism 106 has been substituted for the plain prism 105, a recorded film section 73 has been located at the optical aperture 70, and an apertured mask 98 and apertured baffle 109 have been added to the optical system. The first portion of the projecting beam extends from the projecting lamp 100 to the optical aperture 70 and includes successively the condenser unit 103 and the mask 98 located behind the beam splitter 95 to be transmitted through the latter along the axis "PX1 & 2" which is coincident with the axis of the objective lens 93 and the center of the film specular surface exposed in the optical aperture 70. Upon reflection from the deformed or rippled film specular surface the second portion of this projecting beam, which now bears an image of the film deformed specular surface passes back through the objective lens 93 in the reverse direction to the oblique reflective surface of the beam splitter. Thus the margins of the common beam path optically forward through and then reversely back through the objective lens coincide are identified by "PB1a & 2a" and "PB1b & 2b." The remaining section of this second beam portion is then turned normal by the oblique reflective surface of the beam splitter 95 to be projected into the amici prism 106 for again being turned normal for reflective optical advance successively to the first-surface mirrors 115 and 114 for impingement upon the viewing screen 40, there to display an enlarged replica of the image borne by the recorded film section 73. It is also indicated in FIG. 13 that at a focal distance from the objective lens 93 and preceding the latter in the first projecting beam portion the condenser assembly 103 there projects an image 123 of the projecting lamp image 122. At this point an apertured mask is located so that the filament image 123 is formed in the aperture 99 thereof. Also, at a focal distance optically forward of the objective lens 93 a second image 124 of the projection lamp filament 122 is located along the axis "PX2" of the second projecting beam portion which has been turned normal by the beam splitter reflective surface into the amici prism 106. At the point along the axis "PX2" of this second portion of the projecting beam where the second filament image 124 is produced in focus the image-bearing beam passes through the target area 110 of light baffle 109, this target area also being an aperture.

FIG. 14 is a diagrammatic optical system layout similar to FIG. 12, in the sensitizing and recording mode, differing chiefly in relocation of the projecting light source 100 and the plain prism 105, so that their locations relative to the beam splitter 95 are substituted each for the other. FIG. 15 is a diagrammatic optical layout similar to FIG. 13, in the projecting mode, but showing the alternate locations of the projecting lamp 100 and the amici prism 106. It will be understood that the projecting lamp 100 may extend laterally of the oblique reflective face of the beam splitter 95 a greater distance and have associated therewith a suitable condenser assembly like that illustrated at 103 in FIG. 13 to provide an in-focus image of the lamp filament 122 at the focal distance from the objective lens unit 93, so as to permit an association with this in-focus image of a suitable mask, such as that illustrated at 98 in FIG. 13. The relocation of prisms 105 and 106 behind the beam splitter 93 require the insertion of a third first-surface mirror 215 in the optical axis "PX2."

In FIGS. 16 and 17 are illustrated suitable mounting means for substituting strip film 373 for the fiche 52 or 152. On the spaced rails 54 of the track 53 a base plate 264 may be slidably mounted in substitution for the horizontal slide plate 57 (FIG. 2) which is part of a fiche supporting mechanism. This slide plate 264 is provided with an optical aperture through the center of which the optical axis "OLX" of the objective lens 93 extends. The slide 264 supports a carriage superstructure 146 which supports a supply reel 147, guide spools 148 and a take-up reel 149, for advancing the strip film 373 step-by-step across the optical aperture 170. The slide carriage 264 also supports a pressure shoe-supporting head 175 which carries the spring-biased anode shoe 76 for clamping each film frame securely behind the optical aperture 170. The recording and projecting operations previously described with respect to each fiche film panel is substantially duplicated with respect to each frame of the photoconductive thermoplastic film 373 which has a like specular surface that can be or is selectively deformed in image areas thereof.

In order to have a clear understanding of the optical apparatus illustrated, by way of example, in FIGS. 1 to 7 incl. a form thereof may be a small, portable, completely self-contained unit suitable for desk top use. The display station at which record sheets are to be successively supported may provide the holder assembly 38 in such dimensions as to receive a "legal size" (8.5 inches × 14 inches document. The single sided fiche 52 (FIG. 3) and the double-sided fiche 152 (FIGS. 8 and 9) are designed to have recorded formats each of which is 0.425 inch × 0.700 inch, since the reduction ratio is 20:1. The rectilinear apertures or windows of such fiche are each approximately 0.475 inch x 0.750 inch. The objective lens unit is a 50mm f/2 so located that its rear node is 52.5mm (about 2 inch) from the focal plane in which the specular surface of the photoconductive and thermoplastic film is to be exposed. The optical path from the front lens node to the viewing screen is 1,050mm (about 3 ½ feet). The location of the illumination or copy lamp is such that it will effectively illuminate the data or information bearing face of the record sheet that is clamped between the transparent platen and the viewing screen while avoiding a "hot spot" reflection on the transparent platen. The condenser lens assembly which is located between the projection lamp and the beam splitter will reduce the in-focus filament images to the ratio of about 1:1.5. The first filament image of the projection light filament which is projected in-focus within the aperture of the mask can be accommodated by a mask aperture that is approximately 5mm (about 0.2 inch) in diameter which is concentric with the optical axis. The light baffle at the second in-focus filament image is provided with a circular target area, e.g., an aperture, which is also approximately 5mm (about 0.2 inch) in diameter.

The heater of FIG. 5 is a flat labyrinth of wire, which is about 0.015 inches in diameter, which is located about 0.4 inches from the focal plane at which the specular surface of the photoconductive and thermoplastic film is located. The resistance of this heater filament is low and may be about two ohms. It may be energized by a common step-down filament transformer from a standard power supply of 110VAC. The separate corona cathode is a single strand of thin wire which is about 0.002 inches in diameter, and it is located about 0.8 inches from the film specular surface. The combined form of heater and electrostatic charging cathode of FIG. 10 is a flat labyrinth of thin tungsten wire, or similar suitable filament, about 0.002 inches in diameter, and it is located about 0.4 inches from the film specular surface.

In operating the optical apparatus of FIGS. 1 to 6 incl. in the recording and processing mode a selected panel of the fiche is indexed by the fiche manipulating mechanism to expose the specular surface of this film panel in the window of the vertical slide plate to alignment of the center of this window with the optical axis of the objective lens. The operator may begin the recording with the upper left hand panel of the fiche and then successively index the succeeding panels in the same row to the exposing position for successive recording thereof, and then continue with the successive lower rows which are lifted to the proper elevation by indexing the vertical fiche-holding slide upward step-by-step. It is to be understood that for this recording mode the prism holder will have been adjusted to the "Record" position as is illustrated in FIG. 1, so as to insert the plain prism within the optical system. The manual manipulation of the prism holder effected energization of the illuminating or copy lamp, and it remains energized throughout the recording operations without being pulsed between successive recordings. The specular surface of each film section when it is exposed in the optical aperture in optical alignment with the condenser lens unit is illuminated by the image-bearing recording beam before, during and after recording cycle, since it is not necessary to pulse the copy lamp off and on.

The recording and processing cycle is accomplished by concurrently heating the specular surface of the film exposed in the optical aperture and it is at all times irradiated with the photons of the image borne by the recording beam. The electrons from the energized electrostatic charging field cathode flow toward the anode behind the film to impinge upon the specular surface of the latter and cause the charge to increase to a lesser extent in the more brightly irradiated portions of the image then in the darker portions thereof, since the specular surface of this film is more conductive in the lighter image portions than in the darker image portions thereof. The electrons which impinge the lighter image portions of the exposed film specular surface bleed to the base material, which may be substrates of the film if it is plural-ply or to the anode pressure show by way of the fiche framing material. Thus a latent image of the image borne by the recording beam builds in the specular surface as a differential charge thereon and it reaches equilibrium in about one second. While the film specular surface may be continuously irradiated with the charging electrons the energization of the charging cathode preferably is pulsed to conserve power and increase cathode filament life. The film specular surface which is irradiated with the photons and bombarded by the electrons may then be subjected to the radiant heat output at any time prior to or after the electron image has reached equilibrium, so long as the heating to soften the specular surface occurs at a time that the latent electron image has reached equilibrium. The heating is pulsed to provide the shutter function, and termination of irradiation by heat energy permits the deformed or rippled areas of the specular surface in the darker portions of the image to freeze by cooling in about one second, which completes the recording action.

The operator may perform this recording operation by first mounting a fiche with its film panels unrecorded in a vertical slide of the fiche translating mechanism and index the first film panel to the recording position where the optical aperture window of this vertical slide is optically aligned with the axis of the recording beam path. He may then depress the power "On/Off" button to close the power switch, which energizes the "Power" pilot light so as to inform him that the apparatus has been plugged into the power supply line. He will then manipulate the selector crank arm of the prism holder to the "Record" position which will cause the "Ready" pilot light to glow for advising that the apparatus is ready for the recording operation. The operation will then insert a record sheet or document between the transparent platen and the viewing screen of the opened holder and, after closing the latter, press the "Record" button to close its switch in the relay circuit. Since the time delay relay in the relay circuit is preset for a cycle of about 2 seconds the "Ready" pilot light will go out as the operator depresses the "Record" button and then glow again to indicate that a microimage of the data or information on the document or record sheet has been properly recorded and processed.

The operator may then replace the first document or record sheet in the record holder and repeat the recording operation cycle by first moving the fiche holder to align the next selected unrecorded film panel with the recording beam axis, and thereafter again depress the "Record" button. The operator may continue to repeat this recording cycle with additional documents or record sheets and successive unrecorded film panels until he has completed a desired period of recording. Each recording cycle may require about 10–15 secs., and after the recording of a number thereof the operator will rotate manually the prism selector crank to the "Project" position.

The operator may then manually index the fiche holder through the positions of recording that he has performed, so as to view each recording on the viewing screen (in the absence of any document or record sheet in the holder therefor) in order to verify that the documents have been correctly recorded. If by such check viewing the operator finds that any certain one of the documents has not been recorded to his satisfaction, or if he wishes to remove the recording thereof from the fiche, he may, while observing the image projected therefrom upon the viewing screen, depress the "Erase" button until the projected image on the screen has disappeared, this erasing operation requiring about 4 sec.. After such erasure the operator may then rotate the prism selector crank back to the "Record" position, insert the correct document and record the image projected from its face to the fiche window in which the erased and now unrecorded fiche panel is exposed.

All of these recording functions may be accomplished in normal room light. Any particular fiche may at any time during the recording of the film panels thereof be removed from the fiche manipulating mechanism and left in such light for replacement at any time later to continue recordings on the film panels thereof, or to project earlier recordings on those of the film panels which had been recorded.

If it be desired that the operator irradiate the film specular surface exposed at the optical aperture with photons emanating from the image-Bearing beam throughout a recording cycle while during the first part of such cycle this film surface is irradiated with charging electrons and then the flow of the latter is terminated as irradiation of this surface by heat energy is commenced to continue the latter for the remainder of the cycle, this may be attained by the following changes in the relay circuit and associated circuitry of FIG. 6. An additional, second, time delay relay switch will be inserted, so that it supplements the first time delay relay switch 128. The delay period of switch manipulation of relay 128 may be preset for about 2 sec. and that of the added second time delay relay for about 4 sec.. Supply conductor 125 extending from the "Record" switch 118 will remain connected to the momentarily closable, "Record" push-button switch 136, but will be disconnected from the movable contact of double-throw switch 126 of the conventional relay 127. This movable contact of switch 126 will then be connected to the conductor which connects the "Record" switch 136 in series with the relay coil 129. The "Ready" pilot light 33 will then be connected between the power supply conductor 117 and the unused fixed contact of the double-throw switch 130 of the conventional relay 127, instead of being connected to a fixed contact of double-throw switch 126 of the latter; and the movable contact of this switch 130 will be disconnected from the "Record" push-button switch 136, the coil 129 of this relay and the primary conductor 140 of the step-up and rectifier high voltage cartridge 141, for direct connection to the supply conductor 125. The conductor 144, which is connected to the other fixed contact of the conventional relay switch 130, will be disconnected from one end of the primary winding 132 of heat-supply transformer 133 and one of the fixed contacts of the first time delay relay, double-throw switch 139 for direct connection to one end of coil 131 of the first time delay relay 128, in lieu of connection of this time delay relay coil and the movable contact of switch 139 by conductor 143 to the other fixed contact of conventional relay switch 126. Upon disconnection of conductor 143 from the movable contact of the first time delay relay switch 139 and the coil 131 of the latter it will be connected to the fixed contact of the normally closed switch of the added second time delay relay with the movable contact of this latter closed switch connected directly to the supply conductor 125. Connection of the one end of the transformer primary winding 132 will be shifted from the employed fixed contact of the first time delay relay switch 139 to the fixed contact on the normally open side of the unused double-throw switch of this relay, so that this transformer primary will be energized only after the time delay period preset in the relay 128. This leaves the normally closed and normally open fixed switch contacts of switch 139 for employment to be explained later. The conductor 144 which is connected by such changes to one end of the first time delay relay coil 128 is also connected to the like end of the coil of the added time delay relay coil with the other end of the latter also connected to the power supply conductor 117, so that these time delay relay coils are connected in shunt with respect to each other, and their common connection to conductor 144 is connected to the movable contact of the other double-throw switch which has its normally open switch fixed contact connected to the transformer primary 132. The normally closed switch fixed contact of this same double-throw switch of the first time delay relay 128 is employed in this revision for connection by conductor 140 to the input side of the high voltage cartridge 141, so that the electron charging irradiation output of this high voltage cartridge may be terminated at the end of the preset time delay period of relay 128 when this double-throw switch swings over to energize the heat-supply transformer 133. In order to assure such termination as the cartridge supply is de-energized a larger supply source of the electrostatic charging field may be employed with a bleeder resistor. However, such termination may be effected in a positive manner by opening the secondary circuit of the cartridge 142 to terminate immediately the flow of electrons from the field cathode 82 to the field anode 76, such as by bridging a gap in the conductor 142 with a normally closed switch in the first time delay relay 128 that is opened when the peset time delay interval of the latter terminates, so that the output high voltage DC potential will then exist only between the electrostatic field cathode 82 and heater filament 83 to exclude the film beyond the latter from this field. For this purpse the normally closed switching function of double-throw switch 139 may be employed, with a conductor connecting the normally closed switch fixed contact to one side of this gap in output conductor 142 and another conductor connecting the double-throw contact of such switch to the other side of this gap. In order to assure that there will be no leakage between the double-throw contact of this normally closed switch 139 and its fixed contact, that are connected respectively to opposite sides of the gap in the conductor 142, when this switch is open the other normally open fixed contact of this double-throw switch (which is available since it is unused in the FIG. 6 circuitry) preferably is connected through a large resistor, e.g., ±50,000,000 ohms, to the mid-point of the transformer secondary 138.

In such a circuitry variant just described, momentary closure of the "Record" switch 136 by its push-button 36 causes conventional relay 127 to transfer, by swing apart of the movable contacts of its double-throw switches 126 and 130, so as to energize through conductor 144 the coils of the first 128 and second (added) time delay relays. This establishes a holding voltage through the coil 129 of conventional relay 127 by way of the normally closed switch of the added time delay relay, conductor 143 and manipulated switch 126, so that this relay 127 remains energized throughout the entire cycle. Upon this manipulation of the conventional relay 127, the high voltage DC cartridge 141 is energized through the non-manipulated, left side, double-throw switch of the first time delay relay 128 and the remaining closure of the secondary conductor 142 in its switch 139, to create the electrostatic charging field between the cathode 82 and anode 76 the film at the optical aperture 70. When, after the time delay period (e.g., about 2 sec.) of relay 128, its movable contacts are swung apart in transfer action the transformer primary 132 is energized through manipulated double-throw switch 130 of relay 127 and the now manipulated left side double-throw switch of this time delay relay, so as to energize the heater filament 83 for irradiating the exposed specular surface of the film with heat energy. The attendant manipulation of the double-throw switch 139 of this time delay relay 128 also opens the secondary conductor 142 of the electrostatic charging field cartridge 141, to break the connection to the charging field anode 76 and to connect it through the large resistor to the secondary winding 138 of the heat-applying transformer, whereby to terminate the irradiation of the film specular with electrostatic charging electrons. At the end of the time delay period (e.g., about 4 sec.) of the added time delay relay its switch is manipulated to open position so as to de-energize coil 129 of conventional relay 127 and allow the latter and the two time delay relays to return to their original conditions for completion of the recording cycle.

The apparatus of FIGS. 1 to 7 incl. may be simply converted to projection equipment by merely swinging the prism selector crank to the "Project" position and again closing its power switch by depressing its "On/-Off" button. This effects energization of the projection lamp so as to cause the condenser assembly behind the beam splitter to project an in-focus energized lamp filament within the aperture of the mask which is located immediately behind the beam splitter, so that this aperture functions as a light source for the objective lens. Some of the light rays which pass through the mask aperture and are considerably deviated are reflected by the beam splitter and leave the optical system, while the remainder pass through the beam splitter and illuminate the objective lens aperture. The light bundle extending from the objective lens to the recorded specular surface of the film which is exposed in the optical aperture is collimated to about 3°-half angle of collimation. The light which is reflected by the specular surface of the film at the optical aperture is transmitted back to and through the objective lens as a second substantially collimated bundle. A portion of this returned light, which now constitutes an image bearing projecting beam, is reflected laterally by the reflective surface of the beam splitter and forms a second projection lamp filament image in the target area or aperture of the light baffle. The light that impinged upon the undeformed or rippled image areas of the film specular surface is "Specular" light or "noise" and it forms a round image of the round mask aperture, to pass through the round target area aperature of the light baffle for being transmitted optically forward to the viewing screen. Light rays which are reflected by the deformed or rippled areas of the film specular surface as "signal" light are deviated by these deformations, and if such deviated rays exceed the 3°-half angle they strike the light baffle surface which margins the aperture thereof and are blocked out of the optical system. A 1.5° "out of plane" distortion of the film specular surface in portions of the deformed image areas causes light rays to be reflected with a deviation of 3° relative to the incident beam. Some of these deformations will cause ray deviations which exceed this limit, and, as a consequence specular surface deformations will appear on the viewing screen as portions which are illuminated to a low degree or darker portions which are not illuminated, as contrasted with the brighter illuminated surface portions which were not deformed as image areas.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

Having described my invention, what I claim as new and desire to secure by Letters Patent is the novel subjects matter defined in the following claims:

1. In optical apparatus for producing and/or using photoconductive thermoplastic film having a specular surface selectively deformed in image areas thereof, the combination comprising
   1. means removably to support a record sheet having a light-reflective, image-bearing face;
   2. means to direct light rays upon said image-bearing face of said sheet when the latter is mounted on said support means;
   3. photoconductive thermoplastic film supporting means of a light rays-blocking character mounted in a fixed position and having an optical aperture therein behind which a section of such film may be temporarily supported in fixed position with at least a portion of its specular surface exposed in the aperture;
   4. optical means in front of said film supporting apertured means to direct a recording image-bearing light beam reflected from the image-bearing face of the supported record sheet directly to said aperture and including in the optical path thereof an objective lens unit located a focal distance from said record sheet supporting means, adapted to project the image-bearing beam in focus upon the film specular surface exposed in the aperture;
   5. charging electrons-transfer electrode means behind said film supporting apertured means for location immediately behind such thermoplastic film section when supported in said supporting means with a portion of its specular surface exposed in said aperture; and 6. means interposed in the optical path between said lens unit and said aperture and in the vicinity of the latter while being spaced therefrom to produce electrostatic charges throughout the entire area of said aperture simultaneously and impose them upon the film specular surface exposed in said aperture in a latent pattern corresponding to the darker areas of the image borne by the light beam while this film surface is being irradiated directly by the latter, and to heat soften and depress these electrostatically charged film surface areas with the resulting deformations in the darker areas becoming temporarily fixed upon cessation of the radiation of the heat and cooling of the deformed specular surface of the film.

2. The optical apparatus as defined in claim 1 characterized by the electrostatic charging means and heating means being closely adjacent separate filament units assembled together in a relatively small common space, an isolated electrical source of relatively high DC voltage including said electrostatic charging filament unit as the electrostatic field cathode thereof and an electrostatic field anode located behind the exposed film specular surface, and a separate source of heat generating energy connected to said heating filament unit.

3. In optical apparatus for producing and/or using photoconductive thermoplastic film having a specular surface selectively deformed in image areas thereof, the combination comprising 1. means removably to support a record sheet having a light-reflective, image-bearing face;
2. means to direct light rays upon said image-bearing face of said sheet when the latter is mounted on said support means;
3. photoconductive thermoplastic film supporting means of a light rays-blocking character mounted in a fixed position and having an optical aperture therein behind which a section of such film may be temporarily supported with at least a portion of its specular surface exposed in the aperture;
4. optical means to direct a recording image-bearing light beam reflected from the image-bearing face of the supported record sheet to said aperture and including in the optical path thereof an objective lens unit located a focal distance from said record sheet supporting means, adapted to project the image-bearing beam in focus upon the film specular surface exposed in the aperture; and
5. means interposed in the optical path between said lens unit and said aperture and in the vicinity of the latter while being spaced therefrom to produce electrostatic charges and impose them upon the film specular surface exposed in said aperture in a latent pattern corresponding to the darker areas of the image borne by the light beam while this film surface is being irradiated by the latter, and to heat soften and depress these electrostatically charged film surface areas with the resulting deformations in the darker areas becoming temporarily fixed upon cessation of the radiation of the heat and cooling of the deformed specular surface of the film; said electrostatic charging and heating means being a common filament unit serving as an electrostatic charging field cathode of a relatively high DC voltage electrostatic charging electrical circuit having its field anode located behind the exposed film specular surface, and as a source of heating with a relatively low voltage AC connected to said filament unit.

4. In optical apparatus for producing and/or using photoconductive thermoplastic film having a specular surface selectively deformed in image areas thereof, the combination comprising 1. means removably to support a record sheet having a light-reflective, image-bearing face;
2. means to direct light rays upon said image-bearing face of said sheet when the latter is mounted on said support means;
3. photoconductive thermoplastic film supporting means of a light rays-blocking character mounted in a fixed position and having an optical aperture therein behind which a section of such film may be temporarily supported with at least a portion of its specular surface exposed in the aperture;
4. optical means to direct a recording image-bearing light beam reflected from the image-bearing face of the supported record sheet to said aperture and including in the optical path thereof an objective lens unit located a focal distance from said record sheet supporting means, adapted to project the image-bearing beam in focus upon the film specular surface exposed in the aperture;
5. means interposed in the optical path between said lens unit and said aperture and in the vicinity of the latter while being spaced therefrom to produce electrostatic charges and impose them upon the film specular surface exposed in said aperture in a latent pattern corresponding to the darker areas of the image borne by the light beam while this film surface is being irradiated by the latter, and to heat soften and depress these electrostatically charged film surface areas with the resulting deformations in the darker areas becoming temporarily fixed upon cessation of the radiation of the heat and cooling of the deformed specular surface of the film; and
6. a beam splitter located in said optical path of the image-bearing beam preceding said objective lens unit having a supplemental light source associated therewith selectively to insert a supplemental light beam into the optical path in the absence of the image-bearing beam for passage through this lens unit to said aperture with this supplemental light source located a focal distance along the optical path of the supplemental light beam from this lens unit.

5. The optical apparatus as defined in claim 4 characterized by said supplemental light source being in the form of a projection light source to emit the supplemental light beam as a projection beam, said oblique reflective surface of said beam splitter being arranged to have one of the recording image-bearing light beams and the projection light beam incident thereon for reflection axially through said objective lens unit to said optical aperture with the other of these two beams extending forward in the absence of the other from behind this reflective surface for direct transmission therethrough and axially through this lens unit to the optical aperture; a viewing screen located a focal distance from this lens unit in a reverse direction along at least the common optical path of these two light beams which extends to said optical aperture from said beam splitter; and means to activate said projection light source when the source of light rays that were reflected from the supported record sheet is deactivated for impingement of the projecting light beam upon the deformed film specular surface at said optical aperture and reflection back through said lens unit to and beyond said beam splitter reflective surface optically forward to said viewing screen.

6. The optical apparatus as defined in claim 5 characterized by said record sheet supporting means embodying said viewing screen which is available for viewing use in the absence of such record sheet.

7. The optical apparatus as defined in claim 5 characterized by the axis of the optical path of the recording image-bearing light beam which extends forward to said optical aperture coinciding with at least a portion of that of the projecting light beam which extends in the reverse direction from reflective film at said optical aperture back beyond said beam splitter toward said viewing screen; and by a manipulative prism holder movably mounted at a point on these coinciding optical axes back beyond said beam splitter a distance optically forward of said objective lens unit which is greater than the focal length of said objective lens unit, an image-bearing light beam turning prism and an amici projecting beam turning prism carried by said holder for alternate insertion into the coinciding optical paths upon respective recording and projecting operations.

8. The optical apparatus as defined in claim 7 characterized by said projection light source being an in-focus image of an energized lamp filament; and a light-rays blocking apertured mask located in an orthogonal plane relative to the projecting light beam path at this in-focus light source image.

9. The optical apparatus as defined in claim 7 characterized by said projection light source when energized and said objective lens unit being adapted cooperatively to form an in-focus image of this light source at the focal length of this lens unit optically forward of the latter in the projecting optical path preceding said prism holder; and a movable light-rays baffle associated with said amici prism to be inserted into the projecting light beam in the orthogonal plane of this projecting light source in-focus image upon such insertion of said amici prism.

10. The optical apparatus as defined in claim 9 characterized by said baffle being mounted on said prism holder for movement therewith.

11. The optical apparatus as defined in claim 9 characterized by said projection light source being another in-focus image of an energized lamp filament serving as the source of the light rays of the projection beam at a point preceding said beam splitter; by a light-rays blocking apertured mask located in an orthogonal plane relative to the path of this projection beam and flanking opposite sides of this in-focus light source image; and by control means selectively to energize said heat softening means to heat soften the deformed specular surface of such a film exposed at said optical aperture for allowing surface tension erasure of image deformations imprinted therein without imposing thereon the electrostatic charge and while permitting guidance observation of an image of this deformed specular surface projected upon said viewing screen.

12. In an optical apparatus for producing photoconductive thermoplastic film having a specular surface selectively deformed in image areas thereof, the combination comprising
1. objective lens means directable toward a lighted field of view for receiving therefrom a recording light beam carrying an image of the field of view;
2. photoconductive thermoplastic film holding means located optically beyond said lens means in the path of said light beam as transmitted by the latter to receive from said lens means an in-focus replica of the image borne by such beam for imposition of this image upon a defined area of the deformable specular surface of such film when supported in a temporarily fixed position by said holding means in an orthogonal plane relative to the transmitted portion of the beam so as to expose all of this defined area at one time;
3. electrostatic charging and heating means interposed in the optical path of the beam transmitted portion between said lens means and said holding means and in the near vicinity of the latter while being spaced therefrom to produce, when energized, electrostatic charges and impose them upon said defined area of the deformable specular surface of such holding means supported film in a latent pattern corresponding to the darker areas of the image borne by said beam while this film surface area is being irradiated by the latter for exposure thereof, and to heat soften by radiation for depression of these electrostatically charged film surface areas by virture of the electrostatic charges borne thereby; and
4. means to terminate the radiation of softening heat to such holding means supported film for allowing cooling thereof temporarily to fix the resulting deformations in the image darker areas of the film specular surface.

* * * * *